United States Patent
Biswas et al.

(10) Patent No.: US 10,732,949 B2
(45) Date of Patent: Aug. 4, 2020

(54) DYNAMIC EXTENSION OF RESTRICTED SOFTWARE APPLICATIONS AFTER AN OPERATING SYSTEM MODE SWITCH

(71) Applicant: McAfee, LLC, Santa Clara, CA (US)

(72) Inventors: Shuborno Biswas, Waterloo (CA);
Siddaraya B. Revashetti, Santa Clara, CA (US); Junmin Qiu, Waterloo (CA); Chris Roy, Waterloo (CA); Bhavnesh Sharma, Waterloo (CA); Li Xiao, Waterloo (CA)

(73) Assignee: MCAFEE, LLC, Santa Clara, CA (US)

( * ) Notice: Subject to any disclaimer, the term of this patent is extended or adjusted under 35 U.S.C. 154(b) by 0 days.

(21) Appl. No.: 16/230,701

(22) Filed: Dec. 21, 2018

(65) Prior Publication Data
US 2020/0201615 A1 Jun. 25, 2020

(51) Int. Cl.
*G06F 9/445* (2018.01)
*G06F 8/61* (2018.01)
*G06F 8/65* (2018.01)
*G06F 21/53* (2013.01)
*H04L 29/08* (2006.01)
*G06F 9/50* (2006.01)

(52) U.S. Cl.
CPC ............. *G06F 8/61* (2013.01); *G06F 8/65* (2013.01); *G06F 9/5027* (2013.01); *G06F 21/53* (2013.01); *H04L 67/32* (2013.01); *H04L 67/34* (2013.01); *G06F 2221/2149* (2013.01)

(58) Field of Classification Search
CPC . G06F 8/61; G06F 8/65; G06F 9/5027; G06F 21/53; G06F 2221/2149; H04L 67/32; H04L 67/34
USPC .................................................. 717/168–178
See application file for complete search history.

(56) References Cited

U.S. PATENT DOCUMENTS

2017/0215075 A1* 7/2017 Debates ............ H04M 3/42178

* cited by examiner

*Primary Examiner* — Chuck O Kendall
(74) *Attorney, Agent, or Firm* — Hanley, Flight & Zimmerman, LLC

(57) ABSTRACT

Methods, apparatus, systems, and articles of manufacture are disclosed for dynamic extension of restricted software applications after an operating system mode switch. An example system includes a switch detector to detect a switch of a computing device from a restricted operating system to an unrestricted operating system, and a restricted application upgrader to be invoked when the switch is detected, the restricted application upgrader is to generate a first request to a server to obtain a first executable, the first request including a parameter of a restricted software application of the computing device, execute the first executable to generate a second request to the server to obtain a second executable to install an unrestricted software application associated with the restricted software application, and execute the second executable to install the unrestricted software application.

20 Claims, 13 Drawing Sheets

DYNAMIC EXTENSION OF RESTRICTED SOFTWARE APPLICATIONS AFTER AN OPERATING SYSTEM MODE SWITCH

FIELD OF THE DISCLOSURE

This disclosure relates generally to operating systems and, more particularly, to dynamic extension of restricted software applications after an operating system mode switch.

BACKGROUND

In recent years, operating system providers have offered lightweight or restricted versions of operating systems that operate on top of standard or unrestricted versions of the operating systems. The restricted versions are featured-limited versions that can facilitate improved performance and security when using software applications verified by the operating system providers. A software application running in a restricted mode of an operating system may be using a subset of features compared to the software application running in an unrestricted mode of the operating system. Users of the restricted mode can transition to the corresponding unrestricted mode by deploying the underlying unrestricted operating system stack.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
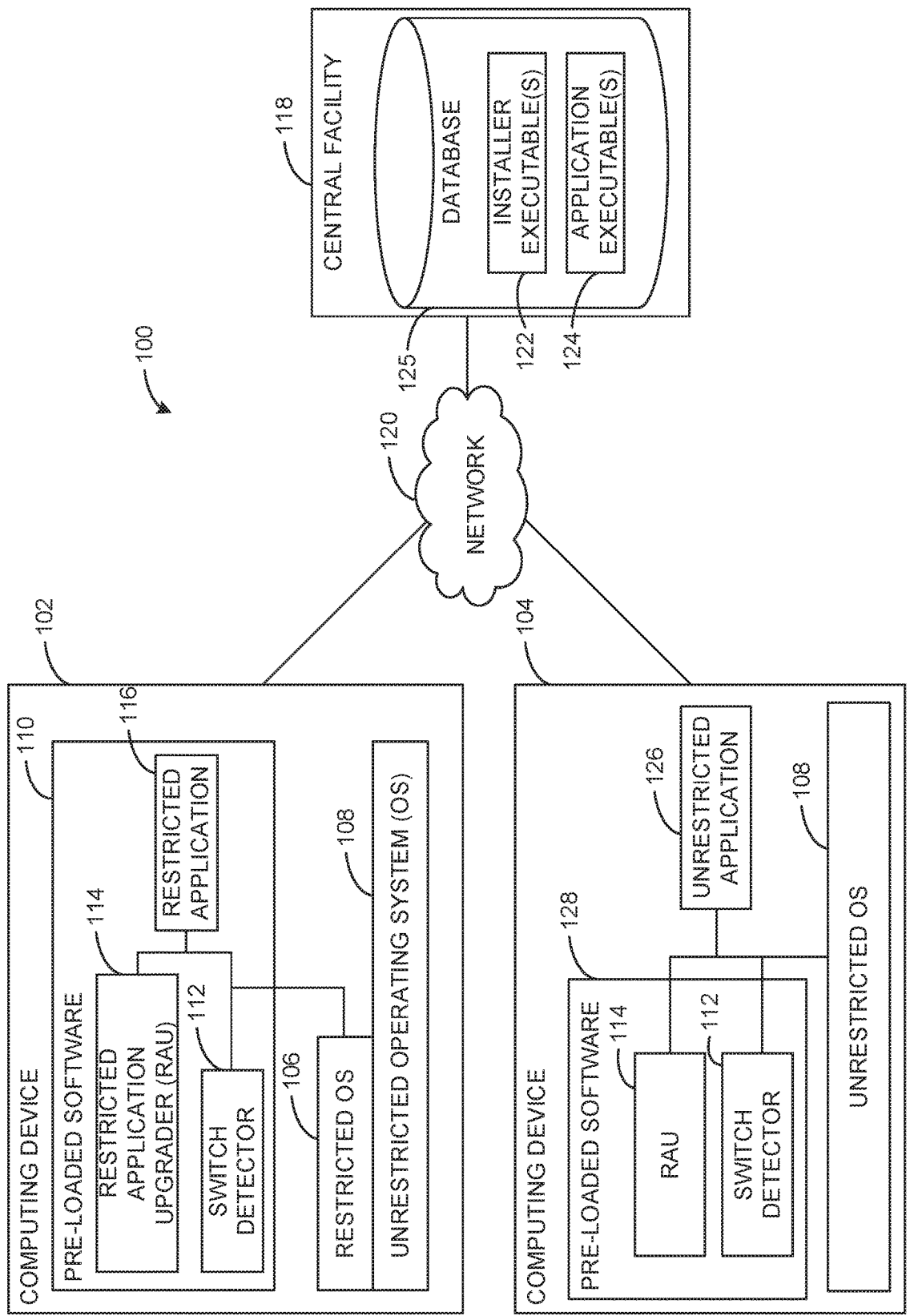
FIG. 1 is a schematic illustration of a first example computing device using an example restricted operating system and a second example computing device using an unrestricted version of the example restricted operating system.

A restricted computing operating environment can offer improved security to a user but at the expense of less customization and configuration. For example, a restricted version of an operating system (OS) on a computing device, such as a desktop computer, a laptop computer, a mobile device (e.g., a smartphone, a tablet, etc.), etc., may allow only software applications verified by an OS provider to run on the restricted OS. In such instances, the OS provider can aggregate the verified software applications in a repository such as an application store (e.g., the App Store®, the GOOGLE PLAY™ store, the Microsoft Store, etc.) from which the user can download and install onto the restricted OS.

In some instances, a verified software application offered in the application store is a restricted application for use in a restricted OS. The restricted application may be a feature-limited version that complies and/or otherwise is compatible with the reduced OS functions and services that are available in the restricted version of the OS. For example, the restricted application may have fewer features, functions, services, etc., when compared to an unrestricted version of the restricted application. In such instances, the restricted application can operate on the unrestricted OS. However, the unrestricted version of the restricted application can require additional functions and services from an OS that are not available in the restricted OS and, thus, is not compatible with the restricted OS.

A user may trigger a transition from the restricted OS to the unrestricted OS. In some instances, the restricted OS operates on top of the unrestricted OS. For example, the unrestricted OS may exist in full on the computing device, but only the restricted functions and services of the unrestricted OS are available for use. In such instances, the computing device can transition or switch from the restricted OS to the unrestricted OS because the unrestricted OS is already installed on the computing device.

In response to the switch, a user may obtain near-instant access to built-in software of the unrestricted OS, where the built-in software may be blocked in the restricted OS. For example, a user may gain access to Microsoft® POWERSHELL™ in Microsoft® Windows® 10, which is an unrestricted OS, after the switch from Microsoft® Windows® 10 in S mode, which is a restricted OS, where Microsoft® POWERSHELL™ is blocked.

When switching to an unrestricted OS, a user may not obtain near-instant access to unrestricted features of non-built-in software, such as restricted applications. Built-in software may be updated from Windows® Update, the application store of the OS provider (e.g., the Microsoft Store), etc., whereas restricted applications may be updated exclusively from third-party distribution (e.g., from a website of a non-OS provider). The user may need to perform additional operations such as navigating to a third-party website to obtain an unrestricted application associated with the restricted application, install the unrestricted application, and configure the unrestricted application for use in the unrestricted OS.

In the example of anti-virus or other computer security software applications, the switch from a restricted OS to an unrestricted OS may expose a computing device to security vulnerabilities. For example, a restricted version of a third-party provided anti-virus software application (e.g., not provided by the OS provider) may not be built-in to the restricted OS but may be obtained from an application store of the OS provider. In response to a switch to the unrestricted OS, the restricted anti-virus software application may need additional application components to protect the computing device when operating in the unrestricted OS. For example, a user may need to obtain an unrestricted version of the restricted anti-virus software application from the website of the third-party provider.

However, unlike built-in software, the restricted anti-virus software application cannot switch to an unrestricted version without user intervention. In some instances, the user is unaware of the security vulnerabilities due to the restricted anti-virus software application not automatically transitioning to an unrestricted anti-virus software application and, therefore, the user does not initiate an operation workflow to obtain the unrestricted anti-virus software application to protect and/or otherwise improve the security of the computing device. For example, the user may not know to visit the third-party website to obtain the unrestricted version and, thus, may expose the computing device associated with the user to security vulnerabilities that may not have existed in the restricted OS but exists in the unrestricted OS.

Examples disclosed herein increase functions available to a computing device after an OS mode switch by facilitating the transition of a restricted application to an unrestricted application. Examples disclosed herein include an example switch detector that executes on a restricted OS. The example switch detector determines and/or otherwise detects a switch event corresponding to a switch from the restricted OS, or restricted mode, to the unrestricted OS, or unrestricted mode. In some disclosed examples, the switch detector determines that the computing device has switched to the unrestricted mode upon initialization of the OS and/or, more generally, the computing device. In some disclosed examples, the switch detector determines that the computing device has switched to the unrestricted mode upon detecting a switch event generated by the OS while in operation.

Examples disclosed herein include the example switch detector to invoke an example restricted application upgrader (RAU) when the OS switches to the unrestricted mode. The example RAU is installed on the restricted OS. The example switch detector triggers the example RAU after the OS is switched to the unrestricted mode. In some disclosed examples, the switch detector invokes the RAU to obtain parameters associated with the unrestricted OS and identify restricted and/or unrestricted applications available on the unrestricted OS.

In some disclosed examples, the RAU requests installation instructions from one or more computer servers based on the obtained parameters and the identified restricted and/or unrestricted applications. The example RAU can use the installation instructions to retrieve a portion of and/or an entire unrestricted application tailored to the computing device. For example, the RAU can retrieve an unrestricted version of the restricted application. In other examples, the RAU can retrieve one or more software components, modules, etc., that can be installed on the computing device to transition and/or otherwise convert the restricted application into the unrestricted application.

In some disclosed examples, the RAU can facilitate the transition of the restricted application to the unrestricted application by prompting and/or guiding a user to install and configure the portion of and/or the entire unrestricted application. Advantageously, by retrieving the portion of and/or the entire unrestricted application upon an OS mode switch, the examples disclosed herein can improve an installation success rate of unrestricted versions of security related applications such as, but not limited to, anti-virus, malware, and/or firewall related applications that improve security operations of the computing device after an OS mode switch.

FIG. 1 is a schematic illustration of an example unrestricted application deployment system 100 including a first example computing device 102 and a second example computing device 104. The computing devices 102, 104 of FIG. 1 are laptop computers. Alternatively, one or both computing devices 102, 104 may be a desktop computer, a server, a mobile device (e.g., a smartphone, a tablet, etc.), or any other type of computing device.

In the illustrated example of FIG. 1, the first example computing device 102 includes an example restricted OS 106 and an example unrestricted OS 108. In FIG. 1, the example restricted OS 106 has a subset of functions, application programming interfaces (APIs), etc., of the functions, the APIs, etc., that are available to the example unrestricted OS 108. For example, the restricted OS 106 and the unrestricted OS 108 may have the same binary footprint. In such examples, a first API is present in both binaries but may only be available and/or otherwise accessible to an application executing on the unrestricted OS 108. For example, the restricted OS 106 may correspond to Microsoft® Windows® 10 in S mode and the unrestricted OS 108 may correspond to Microsoft® Windows® 10. In FIG. 1, the first example computing device 102 is operating in the restricted mode based on the presence and operation of the restricted OS 106. For example, the first computing device 102 may be operating in the restricted mode by using Microsoft® Windows® 10 in S mode, which is operating on top of and/or otherwise based on the Microsoft® Windows® 10 OS. For example, the first computing device 102 may be using the Microsoft® Windows® 10 OS whether operating in the restricted mode (i.e., S mode) 106 or the unrestricted mode (i.e., not S mode) 108.

In the illustrated example of FIG. 1, the first computing device 102 includes first example pre-loaded software 110. The first example pre-loaded software 110 corresponds to software that is installed when the restricted OS 106 and the unrestricted OS 108 are installed. For example, the first pre-loaded software 110 may be included in a computer image used to configure and/or otherwise image the first computing device 102. In such examples, the first pre-loaded software 110 can be available to a user in the restricted mode prior to first use of the restricted OS 106 by the user.

The first example pre-loaded software 110 of FIG. 1 includes an example switch detector 112, an example restricted application upgrader (RAU) 114, and an example restricted software application 116, or a restricted application 116. Alternatively, the first example pre-loaded software 110 may include more restricted applications than the example restricted application 116 depicted in FIG. 1. Alternatively, the example restricted application 116 may not have been pre-loaded on the first example computing device 102 and therefore may not be included in the first example pre-loaded software 110. For example, a user of the first computing device 102 may have installed the restricted application 116 from an application store managed by an OS provider of the restricted OS 106. Alternatively, the first example computing device 102 may include the example restricted application 116 in the first example pre-loaded software 110 while one or more different restricted applications that are not be included in the first pre-loaded software 110 are subsequently installed from the application store.

The example restricted application 116 of FIG. 1 is an anti-virus software application that is compatible with and/or otherwise capable of operating on the restricted OS 106. For example, the restricted application 116 may be an anti-virus software application that has fewer functions, services, etc., when compared to an unrestricted version of the anti-virus software application. Alternatively, the example restricted application 116 may be any other type of restricted or reduced-function software that is compatible with the restricted OS 106.

The switch detector 112 of the illustrated example is an executable including machine-readable instructions that, when executed, executes on the restricted OS 106. Alternatively, the example switch detector 112 may correspond to a function of the restricted OS 106. In FIG. 1, the example switch detector 112 is included in the first example pre-loaded software 110. Alternatively, the first example computing device 102 may retrieve and/or otherwise obtain the example switch detector 112 from an application store associated with the example restricted OS 106.

The example switch detector 112 determines when the first example computing device 102 switches from the example restricted OS 106 to the example unrestricted OS 108. In some examples, the switch detector 112 determines an occurrence of the switch upon an initialization or start-up of the first computing device 102. For example, the switch detector 112 may store a first operating mode of the first computing device 102 in memory (e.g., non-volatile memory) prior to shutting down the first computing device 102. The example switch detector 112 may identify a second operating mode after starting-up the first example computing device 102 and compare the second operating mode to the first operating mode. The example switch detector 112 may determine that the first example computing device 102 switched to the unrestricted OS 108 when the first operating mode is different from the second operating mode.

In some examples, the switch detector 112 determines an occurrence of a switch by detecting a switch event. In some examples, the switch event is an alert, a notification, etc., generated by the unrestricted OS 108 after transitioning from the example restricted OS 106. For example, the switch detector 112 may provide a callback function to be used by the unrestricted OS 108. The callback function enables the example switch detector 112 to subscribe to a change notification (e.g., an OS mode change notification) generated by the example unrestricted OS 108. For example, the unrestricted OS 108 may generate the change notification to be indicative of the transition after the transition to the unrestricted OS 108. In response to generating the change notification, the example unrestricted OS 108 calls or invokes the callback function. The example switch detector 112 detects the switch when the callback function is invoked.

In the illustrated example of FIG. 1, the switch detector 112 invokes the RAU 114 when the first computing device 102 switches to the unrestricted OS 108. In some examples, the RAU 114 is a dormant executable or software application. For example, the RAU 114 may not execute in the restricted mode. The example RAU 114 may operate in the unrestricted mode after the restricted OS 106 transitions to the unrestricted OS 108. When invoked in the unrestricted mode, the example RAU 114 may transmit a request to an example central facility 118 via an example network 120.

The example RAU 114 of the illustrated example of FIG. 1 may request an example installer executable 122 and/or an example application executable 124 from an example database 125. In such examples, the RAU 114 can install an example unrestricted software application 126, or an example unrestricted application 126, in place of the restricted application 116 as depicted in connection with the second computing device 104. In the illustrated example of FIG. 1, the application executable 124, when executed, can install an unrestricted version of the restricted application 116. Additionally or alternatively, although only the installer executables 122 and the application executables 124 are depicted in the database 125, other installer executables 122 and/or other application executables 124 may be included in the database 125.

In the illustrated example of FIG. 1, the second computing device 104 is operating in the unrestricted mode based on the operation of the unrestricted OS 108. For example, the second computing device 104 may be operating in the unrestricted mode by using Microsoft® Windows® 10. The second example computing device 104 includes second example pre-loaded software 128. The second example pre-loaded software 128 includes the example switch detector 112 and the example RAU 114 of the first example pre-loaded software 110. In FIG. 1, the second example pre-loaded software 128 does not include a restricted application such as the restricted application 116 of the first example computing device 102. For example, the RAU 114 of the second computing device 104 may have facilitated the upgrade of the restricted application 116 to the unrestricted application 126 in response to the OS mode switch. Alternatively, the second example pre-loaded software 128 may include one or more restricted applications. For example, a user of the second example computing device 104 may prevent the RAU 114 from switching a restricted application to an unrestricted version of the restricted application.

In some examples, the second computing device 104 has transitioned from the restricted OS 106 to the unrestricted OS 108. For example, the second computing device 104 may have previously included one or more restricted applications, such as the restricted application 116 of the first computing device 102, when operating in the restricted mode. In such examples, after the switch, the switch detector 112 can invoke the RAU 114 to facilitate the conversion and/or replacement of the one or more restricted applications to one or more unrestricted applications, such as the unrestricted application 126 of the second computing device 104.

In some examples, after the switch, the switch detector 112 invokes the RAU 114 to obtain parameters associated with the computing device 104. For example, the RAU 114 may obtain hardware parameters, such as processor parameters, storage parameters, hardware identifiers, etc. In some examples, the RAU 114 can determine and/or otherwise obtain a processor parameter, such as a quantity of processors and/or processing power. In other examples, the RAU 114 can determine and/or otherwise obtain a storage parameter such, as a quantity of storage disk or storage device space. In yet other examples, the RAU 114 can determine and/or otherwise obtain a hardware identifier, such as a media access control (MAC) identifier of one or more hardware components. In other examples, the RAU 114 can determine and/or otherwise obtain a manufacturer identifier or a vendor identifier of one or more hardware components of the computing devices 102, 104, and/or, more generally, a manufacturer identifier or a vendor identifier of the computing devices 102, 104.

In some examples, the RAU 114 obtains software parameters, such as OS parameters, application parameters, etc. For example, the RAU 114 may obtain an OS parameter, such as a configuration (e.g., 32-bit, 64-bit, etc.), a brand (e.g., Microsoft®, Apple®, Linux®, etc.), a version, etc., of the unrestricted OS 108. In other examples, the RAU 114 may obtain an application parameter, such as a presence of one or more other restricted applications, a version of the one or more other restricted applications, a quantity of storage disk or storage device space utilized by the one or more other restricted applications, etc.

In some examples, the first computing device 102 switches to the unrestricted OS 108. In response to detecting the switch, the example switch detector 112 invokes the example RAU 114 to obtain the parameters associated with the first example computing device 102. The example RAU 114 may request the example central facility 118 to transmit the example installer executables 122. In FIG. 1, the example installer executables 122 correspond to one or more software installation packages or executables (e.g., an executable file, executable instructions, executable machine readable instructions, etc.). For example, the installer executables 122 may be machine-readable instructions that, when executed, cause the first example computing device 102 to query, download, install, and/or configure one or more of the example application executables 124 of the database 125 to replace the example restricted application 116 with the example unrestricted application 126.

In some examples, in response to detecting the switch, the switch detector 112 invokes the RAU 114 to inform the central facility 118 of the switch. The example central facility 118 may transmit machine-readable instructions (e.g., one or more executable scripts) to the example RAU 114 of the first computing device 102. In some examples, the RAU 114 executes the one or more obtained scripts to facilitate the switch of the restricted application 116. For example, the RAU 114 may be directed, by executing the one or more scripts, to obtain one or more hardware and/or one or more software parameters associated with the first computing device 102. In such examples, the RAU 114 may generate, by executing the one or more scripts, a uniform resource locator (URL) based on the one or hardware parameters and/or the one or more software parameters. The URL may correspond to an Internet location at which the first example computing device 102 may access and/or otherwise obtain one or more of the installer executables 122. For example, the RAU 114 may invoke the first computing device 102 to retrieve one or more of the installer executables 122 at the generated URL.

In some examples, the RAU 114 transmits one or more parameters to the central facility 118 to invoke the central facility 118 to select one of the installer executables 122 based on the one or more parameters. Accordingly, the example database 125 may include one or more of the installer executables 122 that have been previously built or generated. For example, the RAU 114 may transmit a parameter such as an application parameter indicative of a first version of the restricted application 116 to the central facility 118. In such examples, the central facility 118 can identify a second version of the unrestricted application 126 that corresponds to the first version, where the second version has been previously generated by the central facility 118. For example, the central facility 118 may select and/or otherwise identify a previously generated one of the installer executables 122 corresponding to the second version. The example central facility 118 may transmit the previously generated one of the installer executables 122 to the first example computing device 102 that, when executed by the first example computing device 102, can direct the first computing device 102 to retrieve a previously generated one of the example application executables 124. In such examples, the first computing device 102 retrieves the previously generated one of the application executables by executing an HTTP request to a URL identified in the previously generated one of the example installer executables 122.

In some examples, the RAU 114 transmits one or more parameters to the central facility 118 to invoke the central facility 118 to generate one of the installer executables 122 based on the one or more parameters. Accordingly, the example database 125 may include one or more of the installer executables 122 that have not been previously generated. In some examples, the database 125 includes one or more previously generated and/or one or more not previously generated ones of the installer executables 122. For example, the central facility 118 may build or generate an executable file including machine-readable instructions tailored and/or otherwise directed to the first computing device 102. The example central facility 118 may build one or more of the example installer executables 122 that, when executed by the first example computing device 102, can direct the first computing device 102 to retrieve the example application executable 124, where the application executable has not been previously generated. For example, the RAU 114 may transmit an application parameter indicative of a first version of the restricted application 116 to the central facility 118. In such examples, the central facility 118 can identify a second version of the unrestricted application 126 that corresponds to the first version. In response to the identification, the example central facility 118 may generate the example installer executables 122 to direct the first example computing device 102 to retrieve the second version of the unrestricted application 126. Accordingly, in some examples, the database 125 includes one or more application executables 124 that have not been previously generated. In some examples, the database 125 includes one or more previously generated and/or one or more not previously generated ones of the application executables 124.

In some examples, the central facility 118 generates the installer executables 122 based on one or more hardware parameters. For example, the RAU 114 may determine and transmit to the central facility 118 at least one of a processor parameter indicative of the first computing device 102 having a 3.0 Gigahertz (GHz) processor, a first storage parameter indicative of the first computing device 102 having 500 Gigabytes (GB) of available storage disk or storage device space, or a second storage parameter indicative of the first computing device 102 having 4 GB of volatile memory. In such examples, the central facility 118 can generate the installer executables 122 to direct the first computing device 102 to retrieve a third version of the unrestricted application 126 that is compatible and, in some examples, optimized for use by the first computing device 102 based on the obtained hardware parameters.

In some examples, when the first computing device 102 obtains one of the installer executables 122, the installer executable 122 directs the first computing device 102 to retrieve and execute one of the application executables 124 and install and configure the unrestricted application 126 in a specified manner. For example, when the unrestricted application 126 is an anti-virus software application, the installer executable 122 may instruct the first computing device 102 to configure the anti-virus software application with a specified trial period, an availability of one or more functions, services, etc., and/or select one or more software drivers to install that are compatible with the unrestricted OS 108.

In the illustrated example of FIG. 1, the first computing device 102 and the second computing device 104 are in communication with the central facility 118 via the network 120. The example network 120 of the illustrated example of FIG. 1 is the Internet. However, the example network 120 may be implemented using any suitable wired and/or wireless network(s) including, for example, one or more data buses, one or more Local Area Networks (LANs), one or more wireless LANs, one or more cellular networks, one or more private networks, one or more public networks, etc.

Advantageously, the example switch detector 112 improves and/or otherwise increases an availability of functions, services, etc., on the computing devices 102, 104 by invoking the example RAU 114 when the restricted OS 106 switches to the unrestricted OS 108. In the example of the restricted application 116 and the unrestricted application 126 being anti-virus software applications, the second computing device 104 has improved protection against security vulnerabilities with the unrestricted application 126 when operating in the unrestricted mode. Without the example switch detector 112 and the example RAU 114, a user of the second computing device 104 may not be aware that the restricted application 116 has not been updated to the unrestricted application 126 after the OS mode switch.

Accordingly, the user may not be aware to manually search, retrieve, and install the unrestricted application 126 to protect against potential vulnerabilities in the unrestricted OS 108 that may not have existed when operating using the restricted OS 106. By seamlessly facilitating the transition to the unrestricted application 126 upon detection of the OS mode switch, the example of FIG. 1 illustrates an improvement in an operation of the second computing device 104. The operation of the second example computing device 104 can be improved by increasing the available functions, services, etc., associated with the example unrestricted application 126 when compared to the example restricted application 116 and are accordingly directed to one or more improvement(s) in the functioning of the second computing device 104.

Figure 2:
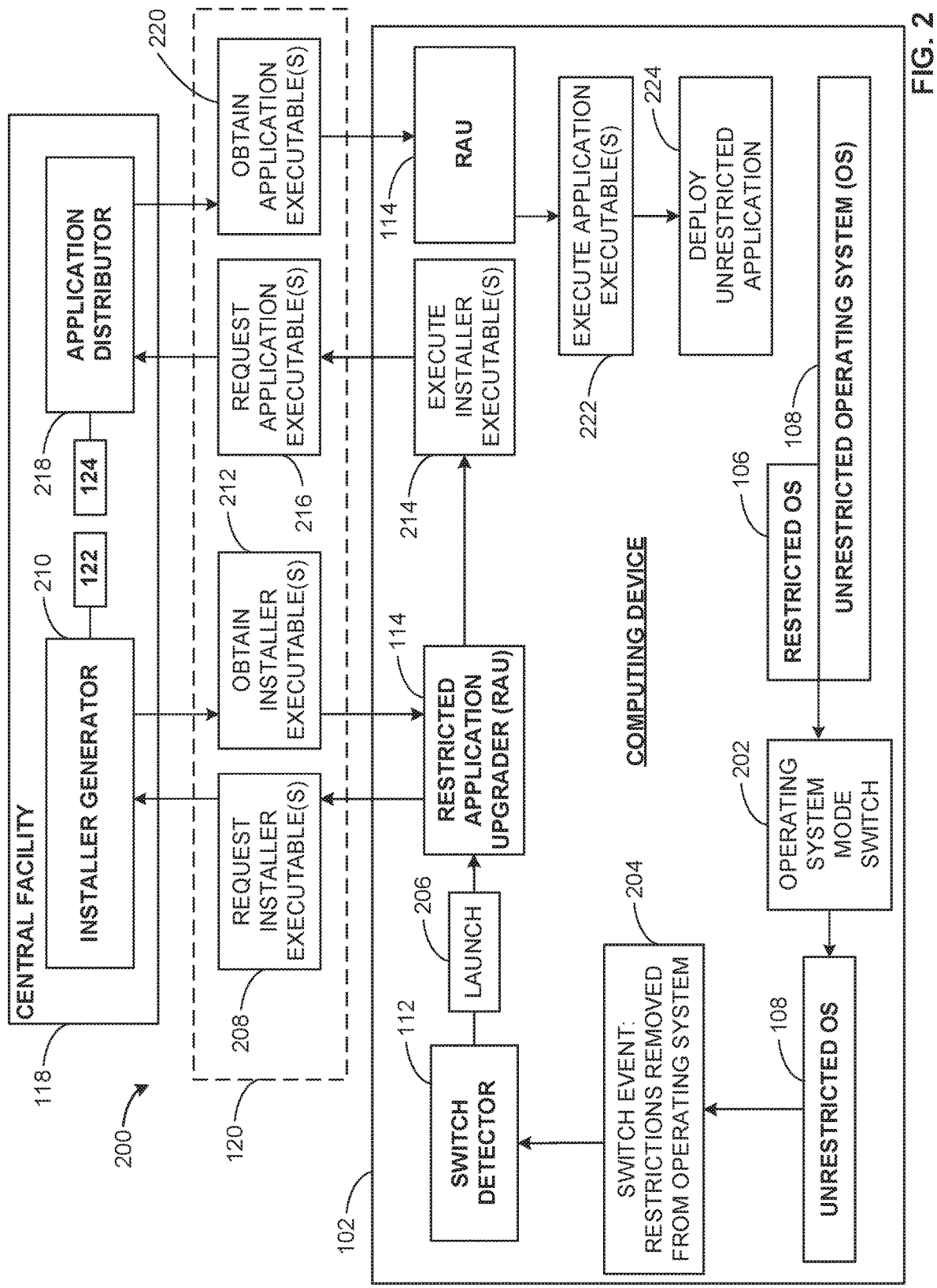
FIG. 2 is a schematic illustration of the example computing device of FIG. 1 switching from the example restricted operating system of FIG. 1 to the example unrestricted operating system of FIG. 1.

FIG. 2 is a schematic illustration of an example workflow 200 of the example unrestricted application deployment system 100 of FIG. 1 to facilitate the transition of the example restricted application 116 of FIG. 1 of the first example computing device 102 to the example unrestricted application 126 of FIG. 1. Additionally or alternatively, the example workflow 200 of the illustrated example of FIG. 2 may correspond to the second example computing device 104 of FIG. 1.

At a first example operation 202 of the example workflow 200, the example restricted OS 106 switches to the example unrestricted OS 108. After the switch, at a second example operation 204, the example unrestricted OS 108 generates a switch event indicative that one or more restrictions have been removed from the OS of a computing device.

In the illustrated example of FIG. 2, the switch detector 112 on the first computing device 102 detects the switch event generated at the second operation 204. In response to the detection, the switch detector 112 launches the RAU 114 post OS switch at a third example operation 206. At a fourth example operation 208, the RAU 114 requests one or more executables from the example central facility 118 via the example network 120 of FIG. 1. For example, the RAU 114 may obtain one or more parameters associated with the first computing device 102 and transmit the one or more parameters to an example installer generator 210 of the central facility 118. The example installer generator 210 selects one or more executables based on the request. For example, the installer generator 210 may select a previously generated one of the installer executables 122 of FIG. 1 based on the parameter from the first computing device 102. In some examples, the installer generator 210 generates one or more executables based on the request. For example, the installer generator 210 may generate one or more of the installer executables 122 in response to the request for the one or more executables. In the illustrated example of FIG. 2, the installer generator 210 generates the one or more installer executables 122 based on the one or more parameters associated with the first computing device 102.

At a fifth example operation 212, the example RAU 114 obtains the executable(s) from the example installer generator 210 via the example network 120. For example, the installer generator 210 may transmit one or more executables to the first computing device 102 after generating the installer executables 122 based on the one or more parameters associated with the first computing device 102. In other examples, the installer generator 210 may facilitate one or more downloads of the installer executables 122 to the first computing device 102 from a content delivery or a content distribution network (CDN). For example, the central facility 118 may include a geographically distributed network of proxy servers and corresponding data centers (e.g., a data center including one or more computer servers) to deliver software, such as the installer executables 122, the application executables 124, etc., to a plurality of computing devices based on a geographic location of requesting ones of the plurality of computing devices, an origin of respective requests for the software, etc.

Alternatively, in some examples, the switch detector 112 may invoke the RAU 114 to generate an alert to the central facility 118 indicative of the OS switch. The example central facility 118 may transmit one or more executable scripts to the RAU 114 that, when executed by the RAU 114, may obtain one or more hardware parameters and/or software parameters associated with the first computing device 102. The one or more executable scripts may configure and/or otherwise facilitate switch operations performed by the example RAU 114. The example RAU 114 may generate, by executing the one or more scripts, a uniform resource locator (URL) based on the one or more hardware parameters and/or the one or more software parameters. The URL may correspond to an Internet location at which the first example computing device 102 may access and/or otherwise obtain one or more of the installer executables 122. For example, the RAU 114 may invoke the first computing device 102 to generate a request at the third operation 208 to retrieve one or more of the installer executables 122 at the generated URL at the fifth operation 212.

At a sixth example operation 214, the RAU 114 executes the executable(s). For example, the RAU 114 may obtain a first executable and a second executable from the installer generator 210. In such examples, the RAU 114 can execute the first executable followed by executing the second executable. At a seventh example operation 216, in response to being executed, the executable(s) generate a request to an example application distributor 218 of the central facility 118 for one or more corresponding application executables via the example network 120. For example, a first executable obtained at the fifth operation 212 may include instructions that, when executed by the first computing device 102, directs the first computing device 102 to download an unrestricted version of the restricted application 116 of FIG. 1.

At an eighth example operation 220, the first example computing device 102 obtains the executable(s) from the example application distributor 218 via the example network 120. For example, the application distributor 218 may transmit to the RAU 114 one or more executables that can install and configure one or more applications. At a ninth example operation 222, the example RAU 114 executes the application executable(s) obtained from the example application distributor 218. For example, the RAU 114 may install and configure the unrestricted application 126 of FIG. 1 that corresponds to an unrestricted version of the restricted application 116 of FIG. 1. At a tenth example operation 224, the example RAU 114 deploys the unrestricted application (e.g., the unrestricted application 126 of FIG. 1) on the first example computing device 102.

Figure 3:
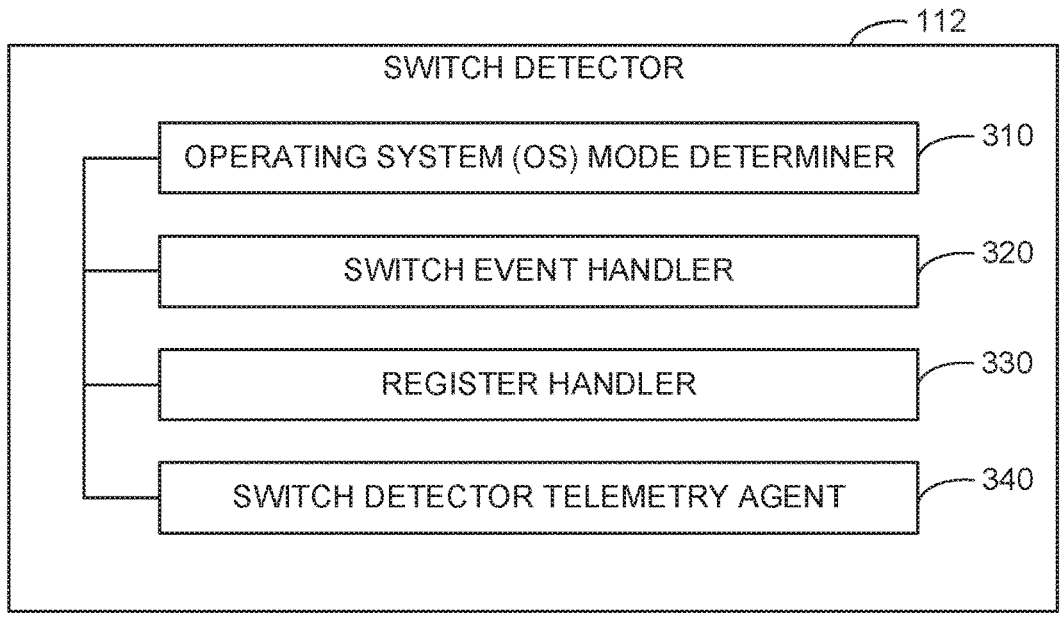
FIG. 3 is a block diagram of an example implementation of the example switch detector of FIGS. 1-2 to implement the examples disclosed herein.

FIG. 3 is a block diagram of an example implementation of the example switch detector 112 of FIGS. 1-2 to implement the examples disclosed herein. In the illustrated example of FIG. 3, the switch detector 112 includes an example OS mode determiner 310, an example switch event handler 320, an example register handler 330, and an example switch detector telemetry agent.

In the illustrated example of FIG. 3, the switch detector 112 includes the OS mode determiner 310 to determine whether an OS of a computing device is an unrestricted or a restricted OS mode. In some examples, the OS mode determiner 310 determines the OS mode by querying and/or otherwise invoking an API of the OS. In other examples, the OS mode determiner 310 queries a register or any other memory location associated with the OS to determine the OS mode.

In some examples, the OS mode determiner 310 determines that the first computing device 102 of FIG. 1 is in a factory image. In some examples, the OS mode determiner 310 determines that the first computing device 102 is in the restricted mode, or operating the restricted OS 106 of FIG. 1. In some examples, the OS mode determiner 310 determines that the first computing device 102 of FIG. 1 is in the unrestricted mode, or operating the unrestricted OS 108 of FIG. 1. The first example computing device 102 may be operating the unrestricted OS 108 when the switch detector 112 did not detect the switch from the restricted OS 106 to the unrestricted OS 108. For example, the OS mode determiner 310 may invoke an OS mode API to determine that the restricted OS 106 of FIG. 1 of the first computing device 102 is operating for the first time (e.g., operating in the factory image), in the restricted mode, and/or the unrestricted mode.

In the illustrated example of FIG. 3, the switch detector 112 includes the switch event handler 320 to detect a switch event and invoke the RAU 114 of FIG. 1 in response to the detection. In some examples, the switch event handler 320 provides a callback function to an OS and subscribe to an OS mode change notification. For example, the switch event handler 320 may provide a callback function to the unrestricted OS 108 of the first computing device 102. In such examples, the unrestricted OS 108 generates the OS mode change notification which, in turn, calls and/or otherwise invokes the callback function. In response to invoking the callback function, the example switch event handler 320 detects the OS mode change from the restricted OS 106 to the unrestricted OS 108. In response to detecting the OS mode change, the example switch event handler 320 invokes the example RAU 114 to transmit an alert to the example central facility 118 indicative of the switch. Responsive to the alert, the example central facility 118 may transmit one or more executable scripts to the example RAU 114 to configure the RAU 114, instruct the RAU 114 to perform one or more operations, and/or direct the RAU 114 to generate a URL to obtain one or more of the installer executables 122 based on one or more parameters associated with the first computing device 102.

In some examples, the switch event handler 320 detects a switch event when a callback function is not invoked. For example, the switch event handler 320 may query the OS mode API or any other API associated with the OS mode of the restricted OS 106. In such examples, the switch event handler 320 can compare the OS mode obtained in response to the query to a last known OS mode of the restricted OS 106 (e.g., a last known OS mode stored in memory of the first computing device 102). The example switch event handler 320 may determine that the switch event handler 320 missed the switch event when the obtained OS mode is different from the last known OS mode, which indicates a switch to the unrestricted OS 108. The example switch event handler 320 may invoke the RAU 114 when the obtained OS mode is determined to be different from the last known OS mode.

In the illustrated example of FIG. 3, the switch detector 112 includes the register handler 330 to register one or more services associated with the switch detector 112 with the restricted OS 106. For example, the register handler 330 may register one or more components, executables, modules, etc., of the switch detector 112 and/or, more generally, the switch detector 112 with the restricted OS 106. For example, the register handler 330 may register a first service that, when triggered, sets a search path to an OS folder path of the RAU 114. In such examples, the register handler 330 can prevent a side-loading attack by setting the search path to a full OS folder path of the RAU 114. The example register handler 330 may register a second service that, when triggered, checks and/or otherwise validates a signature of the example RAU 114 prior to launching the RAU 114.

In some examples, the second service copies an executable of the RAU 114 to a separate folder (e.g., a newly created temporary folder) and executes the executable from the separate folder to mitigate and/or otherwise prevent a side-loading attack. In some examples, the register handler 330 registers and executes a switch detection clean-up service. For example, the switch detection clean-up service may determine whether the switch detection service is to run post switch. In such examples, if the switch detection clean-up service determines that the switch detection service is not to run post switch, then the switch detection clean-up service disables and unregisters the switch detection service and transmits telemetry data to the central facility 118 to indicate the disable and unregistering operations. In other examples, if the switch detection clean-up service determines to run the switch detection service post switch, then the switch detection clean-up service identifies and removes components of the RAU 114 that are not needed post switch.

Additionally or alternatively, the example register handler 330 may register any other service, task, etc., associated with the example switch detector 112. By registering the one or more services, tasks, etc., the example restricted OS 106 may trigger operation of the one or more services upon start-up of the first example computing device 102. Additionally or alternatively, the one or more services, tasks, etc., may invoke one or more API of the example restricted OS 106 after the registration.

In the illustrated example of FIG. 3, the switch detector 112 includes the switch detector telemetry agent 340 to collect and/or otherwise obtain data associated with a computing device operating in the restricted mode. In some examples, the switch detector telemetry agent 340 obtains and transmits telemetry data to the central facility 118 of FIG. 1. In some examples, the switch detector telemetry agent 340 formats the telemetry data as one or more HTTP messages. However, the example switch detector telemetry agent 340 may format the telemetry data using any other message format and/or protocol such as, for example, a file transfer protocol (FTP), a simple message transfer protocol (SMTP), an HTTP secure (HTTPS) protocol, etc.

In some examples, the switch detector telemetry agent 340 transmits an event message including a value to the central facility 118 when the first computing device 102 switches out of the factory image, when the restricted OS 106 switches to the unrestricted OS 108, etc. In other examples, the switch detector telemetry agent 340 may transmit an event message including a value corresponding to each registered service, task, etc., launched in response to detecting the OS mode switch to the central facility 118. In yet other examples, the switch detector telemetry agent 340 may periodically (e.g., every 24 hours, every week, etc.) send an event message including a heartbeat (e.g., a heartbeat value) to the central facility 118 when the first computing device 102 is operating the restricted OS 106.

While an example manner of implementing the example switch detector 112 of FIGS. 1-2 is illustrated in FIG. 3, one or more of the elements, processes, and/or devices illustrated in FIG. 3 may be combined, divided, re-arranged, omitted, eliminated, and/or implemented in any other way. Further, the example OS mode determiner 310, the example switch event handler 320, the example register handler 330, the example switch detector telemetry agent 340, and/or, more generally, the example switch detector 112 of FIG. 3 may be implemented by hardware, software, firmware, and/or any combination of hardware, software, and/or firmware. Thus, for example, any of the example OS mode determiner 310, the example switch event handler 320, the example register handler 330, the example switch detector telemetry agent 340, and/or, more generally, the example switch detector 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example OS mode determiner 310, the example switch event handler 320, the example register handler 330, and/or the example switch detector telemetry agent 340 is/are hereby expressly defined to include a non-transitory computer readable storage device or storage disk such as a memory, a digital versatile disk (DVD), a compact disk (CD), a Blu-ray disk, etc., including the software and/or firmware. Further still, the example switch detector 112 of FIGS. 1-2 may include one or more elements, processes, and/or devices in addition to, or instead of, those illustrated in FIG. 3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
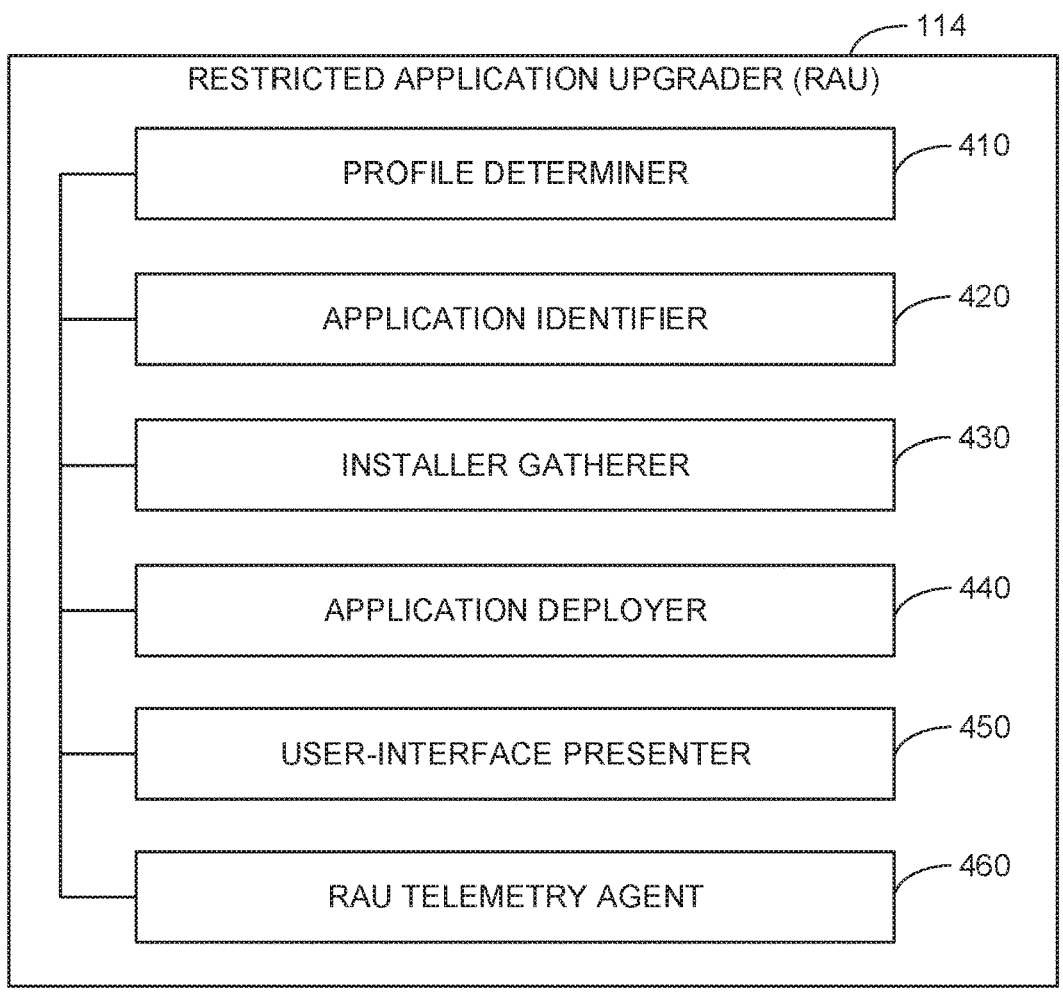
FIG. 4 is a block diagram of an example implementation of the example restricted application upgrader of FIGS. 1-2 to implement the examples disclosed herein.

FIG. 4 is a block diagram of an example implementation of the example RAU 114 of FIGS. 1-2 to implement the examples disclosed herein. In the illustrated example of FIG. 4, the RAU 114 includes an example profile determiner 410, an example application identifier 420, an example installer gatherer 430, an example application deployer 440, an example user-interface presenter 450, and an example RAU telemetry agent 460.

In the illustrated example of FIG. 4, the RAU 114 includes the profile determiner 410 to generate a profile of an OS based on one or more parameters associated with the OS. In some examples, the profile determiner 410 includes obtains hardware parameters, such as processor parameters, storage parameters, hardware identifiers, manufacturer identifiers, vendor identifiers, etc., of and/or otherwise associated with the computing devices 102, 104 of FIG. 1. In some examples, the profile determiner 410 obtains software parameters, such as OS parameters, of the restricted OS 106 and/or the unrestricted OS 108.

In the illustrated example of FIG. 4, the RAU 114 includes the application identifier 420 to identify one or more applications (e.g., the restricted application 116, the unrestricted application 126, etc.) of the computing devices 102, 104. In some examples, the application identifier 420 identifies the restricted application 116 on the first computing device 102 and/or determine one or more application parameters associated with the restricted application 116. For example, the application identifier 420 may determine an application parameter of the restricted application 116, such as a version, a quantity of storage disk or storage device space utilized by the restricted application 116, etc.

In the illustrated example of FIG. 4, the RAU 114 includes the installer gatherer 430 to generate a request to be transmitted to the central facility 118 for one or more of the installer executables 122. In some examples, the installer gatherer 430 formats the request as an HTTP message. However, the example installer gatherer 430 may format the request using any other message format and/or protocol such as, for example, a file transfer protocol (FTP), a simple message transfer protocol (SMTP), an HTTP secure (HTTPS) protocol, etc.

In some examples, the request includes an indication of an OS mode switch, the profile, one or more hardware parameters, and/or one or more software parameters associated with a computing device, such as the first computing device 102. In some examples, the installer gatherer 430 generates the request based on the profile generated by the profile determiner 410. For example, the installer gatherer 430 may generate a request for the one or more installer executables 122 based on one or more hardware parameters, one or more OS parameters, etc., associated with the first computing device 102. In some examples, the installer gatherer 430 generates the request based on the one or more applications identified by the application identifier 420. For example, the installer gatherer 430 may generate the request based on identifying the restricted application 116 and/or one or more application parameters associated with the restricted application 116.

In the illustrated example of FIG. 4, the RAU 114 includes the installer gatherer 430 to execute one or more of the installer executables 122 obtained from the central facility 118. For example, the installer gatherer 430 may execute a first one of the one or more installer executables 122 and, in response to the execution, may facilitate transmitting a request to the central facility 118 for one or more of the application executables 124. In such examples, the installer gatherer 430 can obtain the one or more application executables 124 from the central facility 118.

In the illustrated example of FIG. 4, the RAU 114 includes the application deployer 440 to execute one or more of the application executables 124 obtained from the central facility 118. In some examples, the application deployer 440 invokes and/or otherwise executes the one or more application executables 124 to deploy one or more unrestricted applications, such as the unrestricted application 126 of FIG. 1. In some examples, the application deployer 440 obtains one or more of the application executables 124 from a CDN associated with the central facility 118.

In some examples, the application deployer 440 configures the unrestricted application 126. In some examples, the application deployer 440 configures the unrestricted application 126 by setting a trial period when the unrestricted application 126 is an anti-malware, anti-virus, etc., software application. In some examples, the application deployer 440 disables and/or enables one or more capabilities, functions, etc., of the unrestricted application 126 based on a parameter associated with the computing devices 102, 104 of FIG. 1. For example, the application distributor 218 of the central facility 118 may generate a first one of the application executables 124 by including instructions to disable a first function and to enable a second function of the unrestricted application 126 based on the first computing device 102 having a first parameter, such as a first vendor identifier. In such examples, the application deployer 440 can configure the unrestricted application 126 after executing the first one of the application executables 124 by disabling the first function and enabling the second function using the instructions.

In the illustrated example of FIG. 4, the RAU 114 includes the user-interface presenter 450 to present a user interface to a user of the computing devices 102, 104. In some examples, the user-interface presenter 450 displays a user interface indicating that an OS mode switch has occurred. In some examples, the user-interface presenter 450 presents a user interface requesting user input to trigger the request for the one or more installer executables 122 at the fourth example operation 208 of FIG. 2.

In some examples, the user-interface presenter 450 presents a user interface requesting user input to trigger the execution of the one or more installer executables 122 at the sixth example operation 214 of FIG. 2. In some examples, the user-interface presenter 450 presents a user interface requesting user input to trigger a deployment, a configuration, etc., of the example unrestricted application 126 at the tenth example operation 224 of FIG. 2.

In the illustrated example of FIG. 4, the RAU 114 includes the RAU telemetry agent 460 to collect and/or otherwise obtain data associated with a computing device operating in the unrestricted mode. In some examples, the RAU telemetry agent 460 obtains and transmits telemetry data, such as an event message, to the central facility 118 of FIG. 1. In some examples, the RAU telemetry agent 460 formats the telemetry data as one or more HTTP messages. However, the example RAU telemetry agent 460 may format the telemetry data using any other message format and/or protocol such as, for example, a file transfer protocol (FTP), a simple message transfer protocol (SMTP), an HTTP secure (HTTPS) protocol, etc.

In some examples, the RAU telemetry agent 460 transmits an event message to the central facility 118 when the first computing device 102 executes or prevents the execution of a service associated with the RAU 114. In such examples, the RAU telemetry agent 460 can transmit a first event message when a user triggers the obtaining of the one or more installer executables 122, a second event message when a user prevents the obtaining of the one or more application executables 124, etc.

In some examples, the RAU telemetry agent 460 transmits an event message for one or more instances of a registered service, task, etc., being launched in response to detecting the OS mode switch to the central facility 118. In other examples, the RAU telemetry agent 460 may periodically (e.g., every 24 hours, every week, etc.) send an event message including information of one or more event messages as described above to the central facility 118 to reduce computing resources associated with operation of the RAU 114.

While an example manner of implementing the example RAU 114 of FIGS. 1-2 is illustrated in FIG. 4, one or more of the elements, processes, and/or devices illustrated in FIG. 4 may be combined, divided, re-arranged, omitted, eliminated, and/or implemented in any other way. Further, the example profile determiner 410, the example application identifier 420, the example installer gatherer 430, the example application deployer 440, the example user-interface presenter 450, the example RAU telemetry agent 460, and/or, more generally, the example RAU 114 of FIGS. 1-2 may be implemented by hardware, software, firmware, and/or any combination of hardware, software, and/or firmware. Thus, for example, any of the example profile determiner 410, the example application identifier 420, the example installer gatherer 430, the example application deployer 440, the example user-interface presenter 450, the example RAU telemetry agent 460, and/or, more generally, the example RAU 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example profile determiner 410, the example application identifier 420, the example installer gatherer 430, the example application deployer 440, the example user-interface presenter 450, and/or the example RAU telemetry agent 460 is/are hereby expressly defined to include a non-transitory computer readable storage device or storage disk such as a memory, a digital versatile disk (DVD), a compact disk (CD), a Blu-ray disk, etc., including the software and/or firmware. Further still, the example RAU 114 of FIGS. 1-2 may include one or more elements, processes, and/or devices in addition to, or instead of, those illustrated in FIG. 4, and/or may include more than one of any or all of the illustrated elements, processes, and devices.

Figure 5:
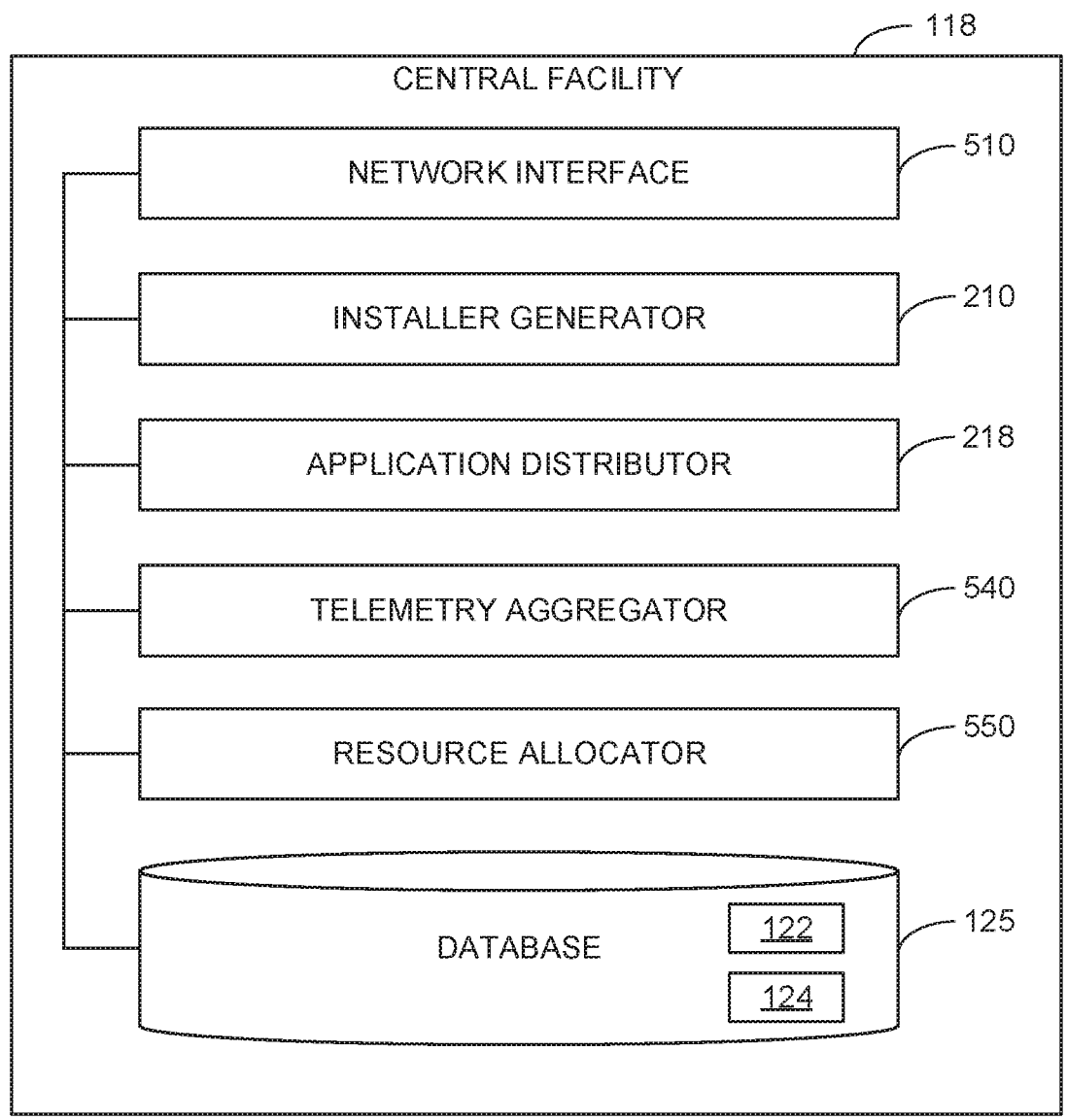
FIG. 5 is a block diagram of an example implementation of the example central facility server of FIGS. 1-2 to implement the examples disclosed herein.

FIG. 5 is a block diagram of an example implementation of the example central facility 118 of FIGS. 1-2 to implement the examples disclosed herein. The example central facility 118 includes one or more servers that dynamically extends functions of restricted applications on computing devices to corresponding unrestricted versions after an OS mode switch. For example, the central facility 118 may include one or more cloud-based servers, where ones of the cloud-based servers have different functions. In such examples, the central facility 118 may include a first cloud-based server that stores ones of the installer executables, the application executables 124, etc., while a second cloud-based server different from the first cloud-based server manages and/or otherwise controls telemetry aggregation and analysis functions. In the illustrated example of FIG. 5, the central facility 118 includes an example network interface 510, the example installer generator 210 of FIG. 2, the example application distributor 218 of FIG. 2, an example telemetry aggregator 540, an example resource allocator 550, and the example database 125 of FIG. 1. In the illustrated example of FIG. 5, the database 125 includes the one or more installer executables 122 of FIGS. 1-2 and the one or more application executables 124 of FIGS. 1-2.

In the illustrated example of FIG. 5, the central facility 118 includes the network interface 510 to obtain information from and/or transmit information to the network 120 of FIG. 1. The example network interface 510 implements a web server that receives requests, telemetry data, etc., from a computing device, such as the first example computing device 102. In some examples, the web server of the network interface 510 transmits the one or more installer executables 122, the one or more application executables 124, etc., to the computing devices 102, 104. The information managed by the example network interface 510 is formatted as one or more HTTP messages. However, any other message format and/or protocol may additionally or alternatively be used such as, for example, a file transfer protocol (FTP), a simple message transfer protocol (SMTP), an HTTP secure (HTTPS) protocol, etc.

In the illustrated example of FIG. 5, the central facility 118 includes the installer generator 210 to select and/or generate one of the installer executables 122 based on a profile, a parameter, etc., from the RAU 114. In some examples, the installer generator 210 selects an installer executable from a previously generated one of the installer executables 122. For example, the installer generator 210 may select a first one of the installer executables 122 that corresponds to installing an unrestricted version of the restricted application 116 of FIG. 1. In some examples, the installer generator 210 generates a new one of the installer executables 122. For example, the installer generator 210 may generate the new one of the installer executables 122 that corresponds to installing a portion of the unrestricted version of the restricted application 116, a configuration change of the restricted application 116, etc. In some examples, the installer generator 210 stores the new one of the installer executables 122 in the database 125 for use by another computing device.

In some examples, the installer generator 210 implements a CDN associated with the central facility 118. For example, the installer generator 210 may control, deploy, and/or otherwise manage a geographically distributed network of proxy servers and corresponding data centers (e.g., a data center including one or more computer servers) to deliver software, such as the installer executables 122, etc., to a plurality of computing devices based on a geographic location of requesting ones of the plurality of computing devices, an origin of respective requests for the software, etc.

In the illustrated example of FIG. 5, the central facility 118 includes the application distributor 218 to select and transmit one of the application executables 124 in response to a request from one of the computing devices 102, 104. In some examples, the application distributor 218 selects an application executable from a previously generated one of the application executables 124. For example, the application distributor 218 may select a first one of the application executables 124 that corresponds to installing an unrestricted version of the restricted application 116 of FIG. 1. In some examples, the application distributor 218 generates a new one of the application executables 124. For example, the application distributor 218 may generate the new one of the application executables 124 that corresponds to installing a portion of the unrestricted version of the restricted application 116, a configuration change of the restricted application 116, etc. In some examples, the application distributor 218 stores the new one of the application executables 124 in the database 125 for use by another computing device.

In some examples, the application distributor 218 implements a CDN associated with the central facility 118. For example, the application distributor 218 may control, deploy, and/or otherwise manage a geographically distributed network of proxy servers and corresponding data centers (e.g., a data center including one or more computer servers) to deliver software, such as the application executables 124, etc., to a plurality of computing devices based on a geographic location of requesting ones of the plurality of computing devices, an origin of respective requests for the software, etc. The example application distributor 218 may implement a CDN that is separate from a CDN controlled by the example installer generator 210, but is associated with the central facility 118.

In the illustrated example of FIG. 5, the central facility 118 includes the telemetry aggregator 540 to determine telemetry parameters by compiling and/or otherwise aggregating information included in telemetry data. In some examples, the telemetry aggregator 540 calculates and/or otherwise determines telemetry parameters based on telemetry data from computing devices such as, the computing devices 102, 104 of FIG. 1. In some examples, the telemetry aggregator 540 determines a telemetry parameter including a quantity of computing devices that are operating in the restricted mode, the unrestricted mode, etc. In some examples, the telemetry aggregator 540 determines a switch rate of computing devices. For example, the telemetry aggregator 540 may determine an OS switch mode rate corresponding to a quantity of devices switching to the unrestricted mode as a function of or within a period of time.

In some examples, the telemetry aggregator 540 determines a telemetry parameter including a ratio (e.g., a conversion ratio, an installation success ratio, etc.) of a first quantity of computing devices that have downloaded and successfully installed the unrestricted application 126 and a second quantity of computing devices that have performed an OS mode switch. In some examples, the telemetry aggregator 540 determines quantities of respective ones of services being invoked or not invoked on monitored ones of computing devices.

In the illustrated example of FIG. 5, the central facility 118 includes the resource allocator 550 to modify a usage of one or more resources, or hardware resources (e.g., computing resources, network resources, storage resources, etc.), of the central facility 118 based on the telemetry parameters. In some examples, the resource allocator 550 generates and executes a model (e.g., a resource allocation model) to identify candidate computing devices operating in the restricted mode that may switch to the unrestricted mode. In some examples, the resource allocator 550 generates the model based on the telemetry parameters that indicate a type and quantity of unrestricted applications being requested by computing devices after an OS mode switch, a type and quantity of configuration parameters associated with the corresponding types of the requested unrestricted applications, a quantity of computing devices operating in the restricted mode, etc. For example, the model may correspond to one or more regression models, one or more statistical models, etc., based on the telemetry parameters from a plurality of computing devices.

In some examples, the resource allocator 550 identifies the candidate computing devices and modifies a usage of resources based on the identification. For example, the resource allocator 550 may increase available network resources to process a predicted increased rate of requests from computing devices based on the model. Alternatively, the example resource allocator 550 may decrease available resources based on the model. Additionally or alternatively, the example resource allocator 550 may increase or decrease one or more resources of the example central facility 118 based on one or more outputs from the model.

In some examples, the resource allocator 550 predicts a first quantity of computing devices to switch to the unrestricted OS 108 by executing the model. The example resource allocator 550 may determine a second quantity of hardware resources (e.g., computing resources, network resources, storage resources, etc.) by calculating a difference between a third quantity of the hardware resources to facilitate requests by the first quantity and a fourth quantity of unused ones of the hardware resources. In such examples, the resource allocator 550 can allocate the hardware resources corresponding to the second quantity to facilitate the requests when the third quantity is more than the fourth quantity. In other examples, the resource allocator 550 can de-allocate and/or otherwise dis-mount the hardware resources corresponding to the second quantity when the third quantity is less than the fourth quantity.

In the illustrated example of FIG. 5, the central facility 118 includes the database 125 to store or record data including the installer executables 122 of FIGS. 1-2, the application executables 124 of FIGS. 1-2, etc. Additionally or alternatively, the example database 125 may include telemetry data, telemetry parameters, a model (e.g., a resource allocation model, regression models, statistical models, etc.), etc. The example database 125 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 125 may additionally or alternatively be implemented by one or more double data rate (DDR) memories, such as DDR, DDR2, DDR3, mobile DDR (mDDR), etc. The example database 125 may additionally or alternatively be implemented by one or more mass storage devices such as hard disk drive(s), compact disk drive(s) digital versatile disk drive(s), etc. While in the illustrated example the database 125 is illustrated as a single database, the database 125 may be implemented by any number and/or type(s) of databases.

Furthermore, the data stored in the database 125 may be in any data format such as, for example, binary data, comma delimited data, tab delimited data, structured query language (SQL) structures, etc.

While an example manner of implementing the central facility 118 of FIGS. 1-2 is illustrated in FIG. 5, one or more of the elements, processes, and/or devices illustrated in FIG. 5 may be combined, divided, re-arranged, omitted, eliminated, and/or implemented in any other way. Further, the example network interface 510, the example installer generator 210, the example application distributor 218, the example telemetry aggregator 540, the example resource allocator 550, the example database 125, and/or, more generally, the example central facility 118 of FIG. 5 may be implemented by hardware, software, firmware, and/or any combination of hardware, software, and/or firmware. Thus, for example, any of the example network interface 510, the example installer generator 210, the example application distributor 218, the example telemetry aggregator 540, the example resource allocator 550, the example database 125, and/or, more generally, the example central facility 118 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example network interface 510, the example installer generator 210, the example application distributor 218, the example telemetry aggregator 540, the example resource allocator 550, and/or the example database 125 is/are hereby expressly defined to include a non-transitory computer readable storage device or storage disk such as a memory, a digital versatile disk (DVD), a compact disk (CD), a Blu-ray disk, etc., including the software and/or firmware. Further still, the example central facility 118 of FIGS. 1-2 may include one or more elements, processes, and/or devices in addition to, or instead of, those illustrated in FIG. 5, and/or may include more than one of any or all of the illustrated elements, processes, and devices.

Flowcharts representative of example hardware logic, machine readable instructions, hardware implemented state machines, and/or any combination thereof for implementing the example switch detector 112 of FIGS. 1-3, the example RAU 114 of FIGS. 1-2 and/or 4, the example central facility 118 of FIGS. 1-2 and/or 5, and/or, more generally, the example unrestricted application deployment system 100 of FIGS. 1-2 are shown in FIGS. 6-12. The machine readable instructions may be an executable program or portion of an executable program for execution by a computer processor such as the processor 1312 shown in the example processor platform 1300 discussed below in connection with FIG. 13 and/or the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1312 of FIG. 13 and/or the processor 1412 of FIG. 14, but the entire program and/or parts thereof could alternatively be executed by a device other than the processor 1312 of FIG. 13 and/or the processor 1412 of FIG. 14 and/or embodied in firmware or dedicated hardware. Further, although the example program is described with reference to the flowcharts illustrated in FIGS. 6-12, many other methods of implementing the example switch detector 112, the example RAU 114, the example central facility 118, and/or, more generally, the example unrestricted application deployment system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 6:
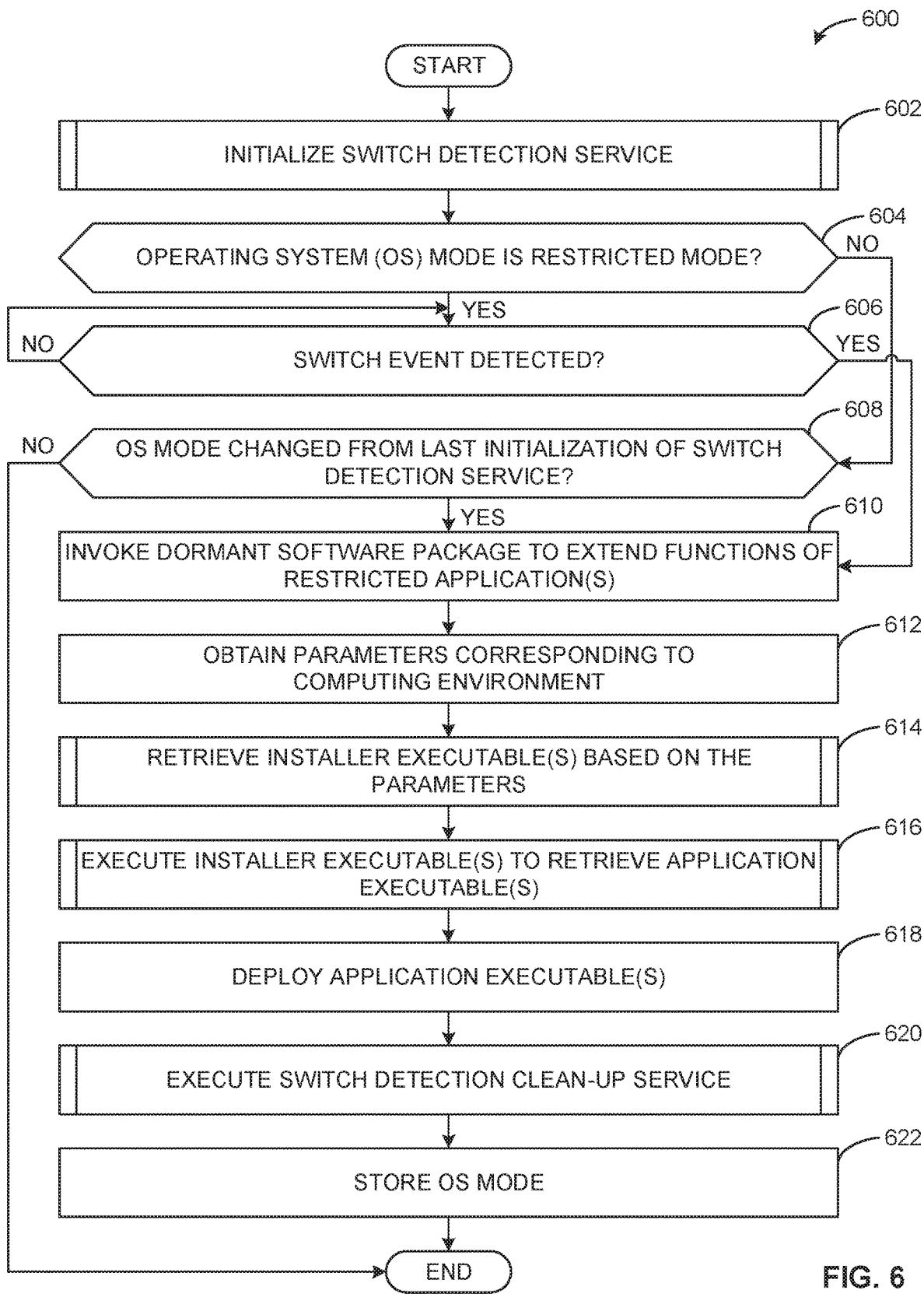
FIG. 6 is a flowchart representative of machine readable instructions that may be executed to implement the example switch detector of FIGS. 1-3, the example restricted application upgrader of FIGS. 1-2 and 4, and/or the example central facility server of FIGS. 1-2 and 5 to extend functions of a restricted application when a computing device transitions to an unrestricted mode of an operating system.

FIG. 6 is a flowchart representative of example machine readable instructions 600 that may be executed to implement the example switch detector 112 of FIGS. 1-3, the example RAU 114 of FIGS. 1-2 and/or 4, and/or the example central facility 118 of FIGS. 1-2 and/or 5 to extend functions of the example restricted application 116 of FIG. 1 when the first example computing device 102 of FIG. 1 transitions to the example unrestricted OS 108 of FIG. 1. The example machine readable instructions 600 of FIG. 6 begin at block 602, at which the example switch detector 112 initializes a switch detection service. For example, the register handler 330 (FIG. 3) may invoke a service registered with the restricted OS 106 of FIG. 1 when the first computing device 102 boots up, powers up, etc., where the service is to detect a switch event. An example process that may be used to implement block 602 is described below in connection with FIG. 7.

At block 604, the example switch detector 112 determines whether the OS mode is the restricted mode. For example, the OS mode determiner 310 (FIG. 3) may determine that the first computing device 102 is operating in the restricted mode based on the operation of the restricted OS 106. In other examples, the OS mode determiner 310 may determine that the first computing device 102 is operating in the unrestricted mode based on the operation of the unrestricted OS 108.

If, at block 604, the example switch detector 112 determines that the OS mode is the unrestricted mode, control proceeds to block 608 to determine whether the OS mode changed from the last initialization. If, at block 604, the example switch detector 112 determines that the OS mode is the restricted mode, then, at block 606, the switch detector 112 determines whether a switch event is detected. For example, the switch event handler 320 (FIG. 3) may determine that a callback function has been invoked in response to the first computing device 102 switching to the unrestricted OS 108.

If, at block 606, the example switch detector 112 determines that the switch event has not been detected, control waits at block 606 until a switch event is detected. If, at block 606, the example switch detector 112 determines that a switch event is detected, then, at block 608, the switch detector 112 determines whether the OS mode has changed from the last initialization of the switch detection service. For example, the OS mode determiner 310 may determine that a stored version of the OS mode is the restricted mode and the current OS mode is the unrestricted mode. In such examples, the OS mode determiner 310 may determine that the switch event handler 320 missed and/or otherwise did not process the switch event.

If, at block 608, the example switch detector 112 determines that the OS mode did not change from the last initialization of the switch detection service, the example machine readable instructions 600 of FIG. 6 conclude because the switch detector 112 has already processed the switch of the first computing device 102 to the unrestricted mode. If, at block 608, the example switch detector 112 determines that the OS mode changed from the last initialization of the switch detection service, then, at block 610, the switch detector 112 invokes a dormant software package to extend functions of restricted application(s). For example, the switch detector 112 may invoke the RAU 114 to trigger the transition of the restricted application 116 to the unrestricted application 126 of FIG. 1. In such examples, the RAU 114 may transmit an alert, a message (e.g., an HTTP message), etc., to the central facility 118 indicative of the OS mode switch. The example central facility 118 may transmit one or more executable scripts to the example RAU 114 to direct the RAU 114 to generate a URL that, when accessed by the first computing device 102, may obtain one or more of the installer executables 122 of FIG. 1. In some examples, the central facility 118 selects a previously generated one of the installer executables 122 while, in other examples, the central facility 118 generates a new one of the installer executables 122 based on one or more parameters associated with the first computing device 102.

At block 612, the example RAU 114 obtains parameters corresponding to the computing environment. For example, the profile determiner 410 (FIG. 4) may generate a profile of the first computing device 102 based on one or more hardware parameters, one or more software parameters, etc., and/or a combination thereof associated with the first computing device 102. In other examples, the application identifier 420 may identify one or more applications, such as the restricted application 116, and determine one or more application parameters associated with the one or more applications.

At block 614, the example RAU 114 retrieves installer executable(s) based on the parameters. For example, the installer gatherer 430 (FIG. 4) may transmit the profile, the one or more application parameters, etc., and/or a combination thereof to the central facility 118 to cause the central facility 118 to generate and/or select one or more of the installer executables 122 to be transmitted to the installer gatherer 430. For example, the central facility 118 may select a previously generated one of the installer executables 122 or generate a new one of the installer executables 122. An example process that may be used to implement block 614 is described below in connection with FIG. 8.

At block 616, the example RAU 114 executes the installer executable(s) to retrieve the application executable(s). For example, the application deployer 440 (FIG. 4) may execute the one or more installer executables 122 to cause the central facility 118 to generate and/or select one or more of the application executables 124 to be transmitted to the application deployer 440. An example process that may be used to implement block 616 is described below in connection with FIG. 9.

At block 618, the example RAU 114 deploys the application executable(s). For example, the application deployer 440 may install and configure the unrestricted application 126. In such examples, the application deployer 440 can install the unrestricted application 126 by uninstalling and/or otherwise removing the restricted application 116 from the first computing device 102 or by installing additional components or modules of the restricted application 116 to convert the restricted application 116 to the unrestricted application 126.

At block 620, the example switch detector 112 executes a switch detection clean-up service. For example, the register handler 330 may disable and unregister one or more services associated with the switch detector 112 when the switch detection service is not to be run post switch. In other examples, the register handler 330 may remove unnecessary software components when then switch detection service is to be run post switch. An example process that may be used to implement block 620 is described below in connection with FIG. 11.

At block 622, the example switch detector 112 stores the OS mode. For example, the OS mode determiner 310 may store a value indicative of the unrestricted mode to be used by the switch detection service upon re-initialization. In response to storing the OS mode at block 622, the example machine readable instructions 600 of FIG. 6 conclude.

Figure 7:
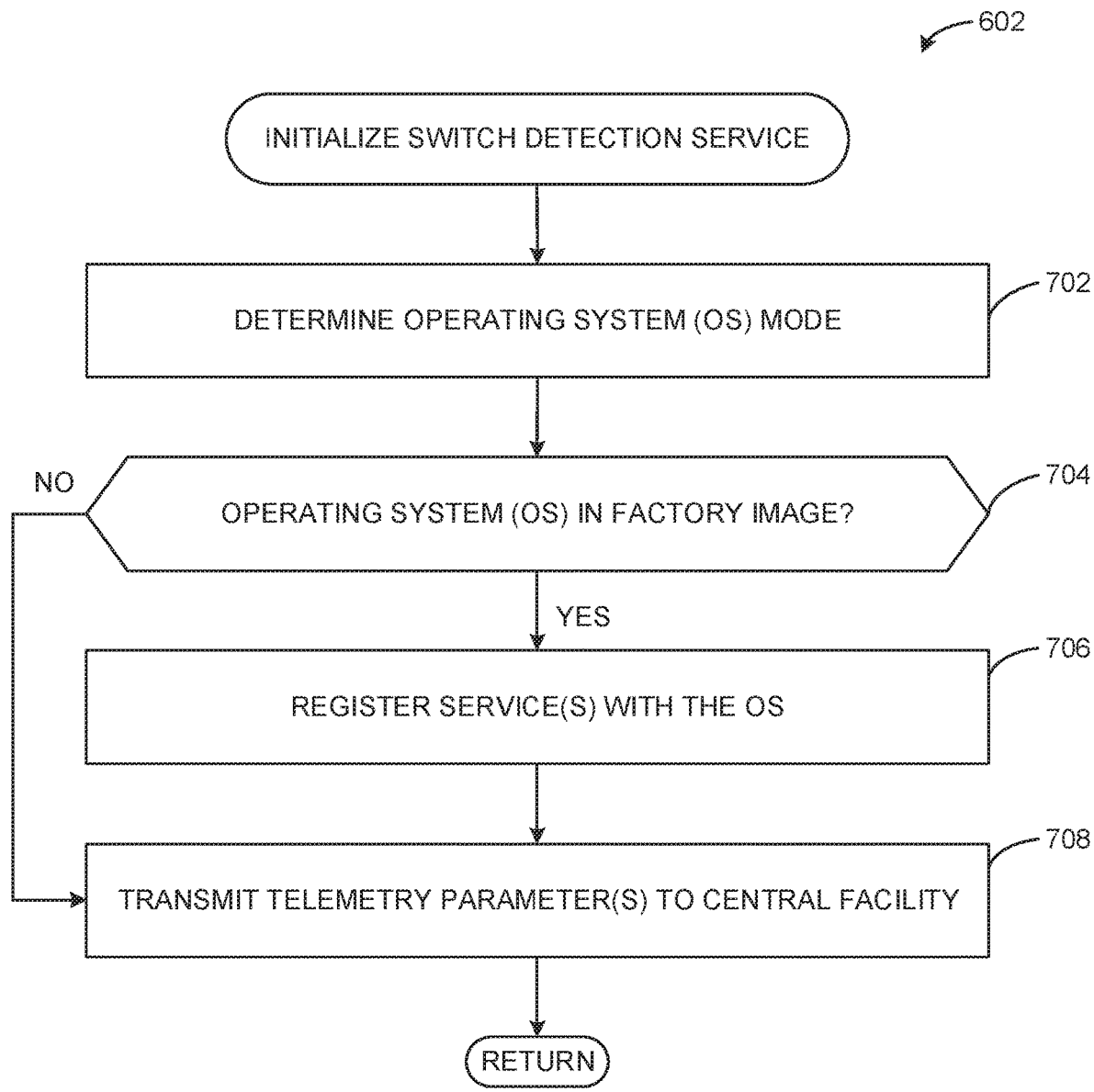
FIG. 7 is a flowchart representative of machine readable instructions that may be executed to implement the example switch detector of FIGS. 1-3 to initialize a switch detection service.

FIG. 7 is a flowchart representative of an example implementation of block 602 of FIG. 6 that may be performed by the example switch detector 112 of FIGS. 1-3 to initialize a switch detection service. The example implementation of block 602 begins at block 702, at which the example switch detector 112 determines the OS mode. For example, the OS mode determiner 310 (FIG. 3) may determine that the first computing device 102 is in the restricted mode. In such examples, the OS mode determiner 310 can determine that the first computing device 102 is in the factory image in which the first computing device 102 is in the restricted mode but not yet operated, configured, modified, etc., by a user.

At block 704, the example switch detector 112 determines whether the OS is in the factory image. For example, the OS mode determiner 310 may determine that, upon initialization of the first computing device 102, is operating in the factory default OS image.

If, at block 704, the example switch detector 112 determines that the OS is in the factory image, control proceeds to block 708 to transmit telemetry parameter(s) to the central facility. If, at block 704, the example switch detector 112 determines that the OS is not in the factory image, then, at block 706, the switch detector 112 registers service(s) with the OS. For example, the register handler 330 (FIG. 3) may register one or more services with the restricted OS 106 of the first computing device 102. In such examples, the one or more services can correspond to one or more functions of the switch detector 112 such as detecting a switch event, invoking the RAU 114, transmitting telemetry data, etc.

At block 708, the example switch detector 112 transmits telemetry parameter(s) to the example central facility 118. For example, the switch detector telemetry agent 340 (FIG. 3) may transmit telemetry data to the central facility 118. In such examples, the switch detector telemetry agent 340 may transmit an event message to the central facility 118 indicating that the first computing device 102 is operating in the restricted mode, has transitioned out of the factory image, etc. In response to transmitting the telemetry parameter(s) to the example central facility 118, the example implementation of block 602 returns to block 604 of the example machine readable instructions 600 of FIG. 6 to determine whether the OS mode is in the restricted mode.

Figure 8:
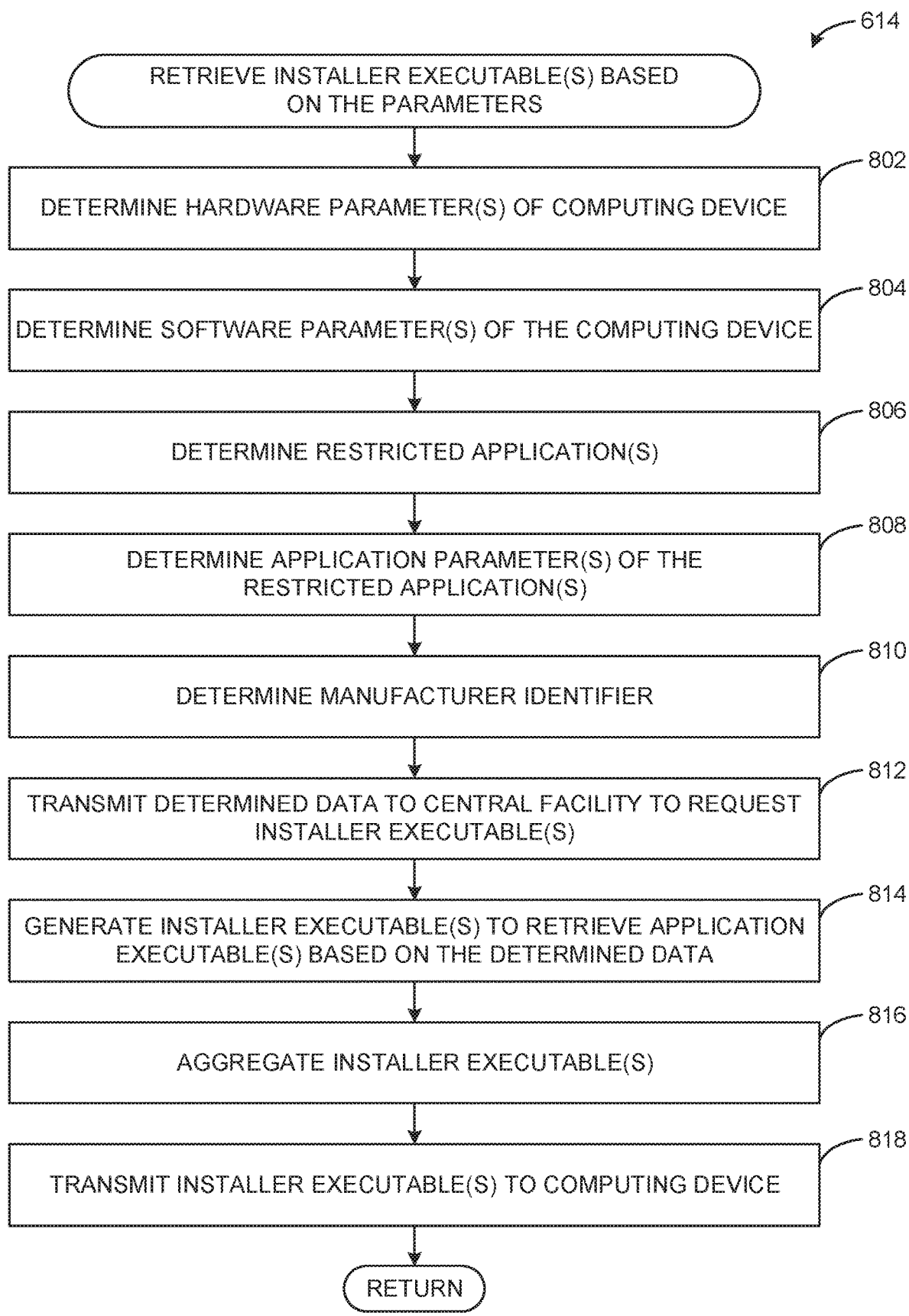
FIG. 8 is a flowchart representative of machine readable instructions that may be executed to implement the example restricted application upgrader of FIGS. 1-2 and 4 to retrieve installer executable(s) based on parameters of the example computing device of FIGS. 1-2.

FIG. 8 is a flowchart representative of an example implementation of block 614 of FIG. 6 that may be performed by the example RAU 114 of FIGS. 1-2 and 4 to retrieve installer executable(s) based on parameters of the first example computing device 102 of FIGS. 1-2. The example implementation of block 614 begins at block 802, at which the example RAU 114 determines hardware parameter(s) of the first example computing device 102. For example, the profile determiner 410 (FIG. 4) may develop and/or otherwise generate a profile of the first computing device 102 by determining one or more processor parameters, storage parameters, hardware identifiers, etc., and/or a combination thereof of the first computing device 102.

At block 804, the example RAU 114 determines software parameter(s) of the computing device. For example, the profile determiner 410 may generate the profile of the first computing device 102 by determining the configuration, the brand, the version, etc., of the unrestricted OS 108.

At block 806, the example RAU 114 determines restricted application(s). For example, the application identifier 420 (FIG. 4) may identify one or more restricted applications, such as the restricted application 116, on the first computing device 102.

At block 808, the example RAU 114 determines application parameter(s) of the restricted application(s). For example, the application identifier 420 may obtain an application parameter, such as a version of the restricted application 116, a quantity of storage disk or storage device space utilized by the restricted application 116, etc.

At block 810, the example RAU 114 determines a manufacturer identifier. For example, the profile determiner 410 may determine an identifier that corresponds to a manufacturer, a vendor, etc., of the restricted OS 106, the first computing device 102, etc. In other examples, the application identifier 420 may determine an identifier that corresponds to a manufacturer, a vendor, etc., of the restricted application 116.

At block 812, the example RAU 114 transmits determined data to the example central facility 118 to request installer executable(s). For example, the installer gatherer 430 (FIG. 4) may generate and transmit a request to the central facility 118 to retrieve one or more of the installer executables 122. In such examples, the request can include the profile, the one or more hardware parameters, the one or more software parameters, the one or more application parameters, the manufacturer identifier, etc.

At block 814, the example central facility 118 generates installer executable(s) to retrieve application executable(s) based on the determined data. For example, the network interface 510 (FIG. 5) may obtain the request from the RAU 114. In such examples, the installer generator 210 (FIGS. 2 and 5) can generate one of the installer executables 122 based on the request. In other examples, the installer generator 210 may select a previously generated one of the installer executables 122 based on the request.

At block 816, the example central facility 118 aggregates the installer executable(s). For example, the installer generator 210 may aggregate one or more of the installer executables 122 into one or more files.

At block 818, the example central facility 118 transmits the installer executable(s) to the first computing device 102. For example, the installer generator 210 may transmit one or more of the installer executables 122 to the first computing device 102. In response to the first example computing device 102 obtaining the installer executable(s) from the example central facility 118 at block 818, the example implementation of block 614 returns to block 616 of the example machine readable instructions 600 of FIG. 6 to execute the installer executable(s) to retrieve the application executable(s).

Figure 9:
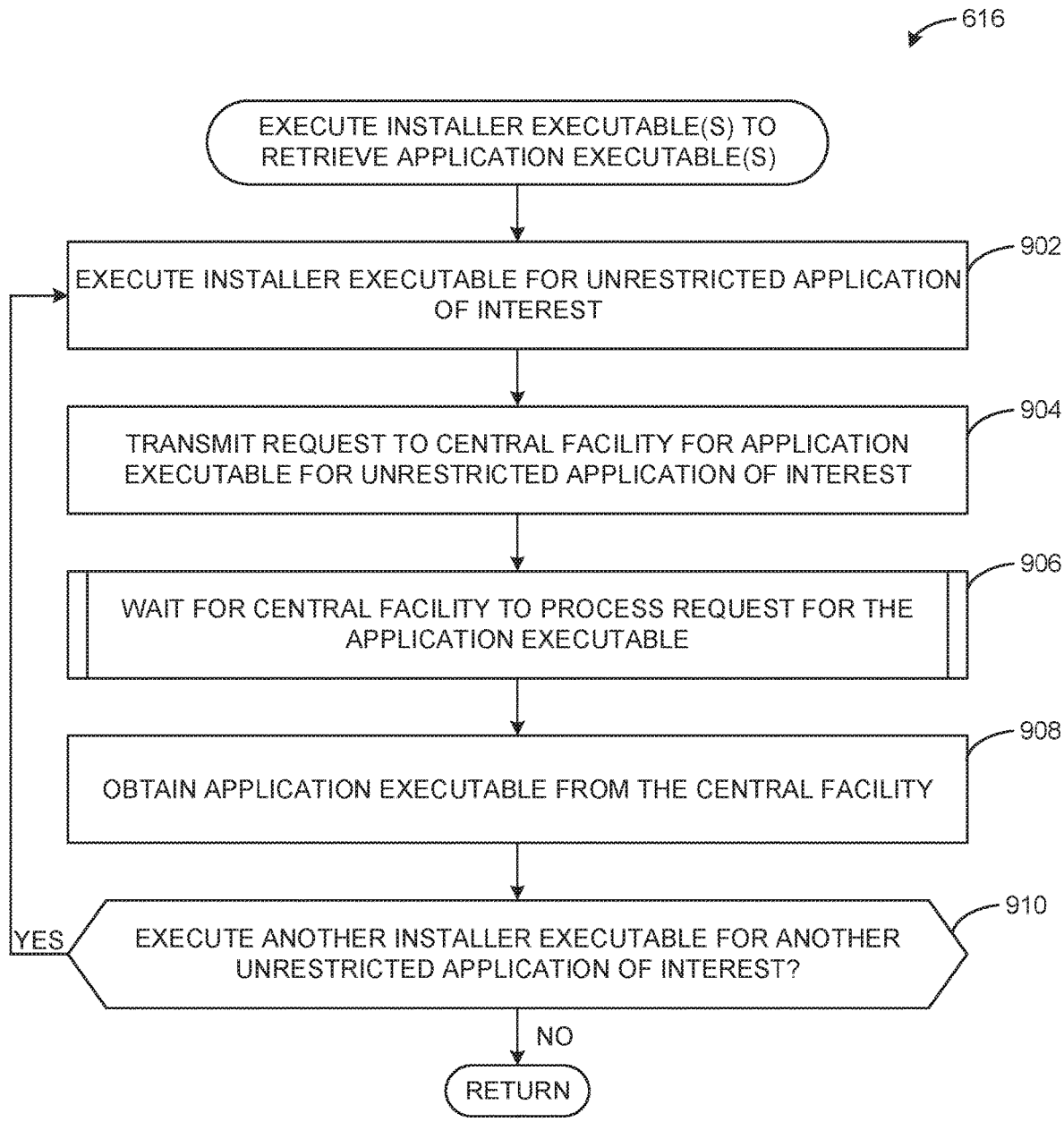
FIG. 9 is a flowchart representative of machine readable instructions that may be executed to implement the example restricted application upgrader of FIGS. 1-2 and 4 to execute installer executable(s) to retrieve application executable(s).

FIG. 9 is a flowchart representative of an example implementation of block 616 of FIG. 6 that may be performed by the example RAU 114 of FIGS. 1-2 and 4 to execute installer executable(s) to retrieve application executable(s). The example implementation of block 616 begins at block 902, at which the example RAU 114 executes an installer executable for an unrestricted application of interest. For example, the application deployer 440 (FIG. 4) may execute a first one of the installer executables 122 associated with installing the unrestricted application 126. In such examples, the application deployer 440 can direct the user-interface presenter 450 (FIG. 4) to present a user-interface to a user to obtain user input on whether to proceed with installing the unrestricted application 126. Alternatively, the example application deployer 440 may download the one or more application executables 124 from a CDN associated with the example central facility 118.

In response to the user proceeding with the installation, the example RAU 114 transmits a request to the example central facility 118 for an application executable for the unrestricted application of interest at block 904. For example, the application deployer 440 may generate a request to cause the central facility 118 to transmit a first one of the application executables 124 that can be used to install the unrestricted application 126.

At block 906, the example RAU 114 waits for the example central facility 118 to process the request for the application executable. An example process that may be used to implement block 906 is described below in connection with FIG. 10.

At block 908, the example RAU 114 obtains the application executable from the example central facility 118. For example, the application deployer 440 may obtain the first one of the application executables 124 that can be used to install the unrestricted application 126.

At block 910, the example RAU 114 determines whether to execute another installer executable for another unrestricted application of interest. For example, the application deployer 440 may execute a second one of the installer executables 122 associated with installing a second unrestricted application. In such examples, the application deployer 440 can direct the user-interface presenter 450 to update the user-interface, present another user-interface, etc., to the user to obtain user input on whether to proceed with installing the second unrestricted application.

If, at block 910, the example RAU 114 determines to execute another installer executable for another unrestricted application of interest, control returns to block 902. If, at block 910, the example RAU 114 determines not to execute another installer executable, the example implementation of block 616 returns to block 618 of the example machine readable instructions 600 of FIG. 6 to deploy the application executable(s).

Figure 10:
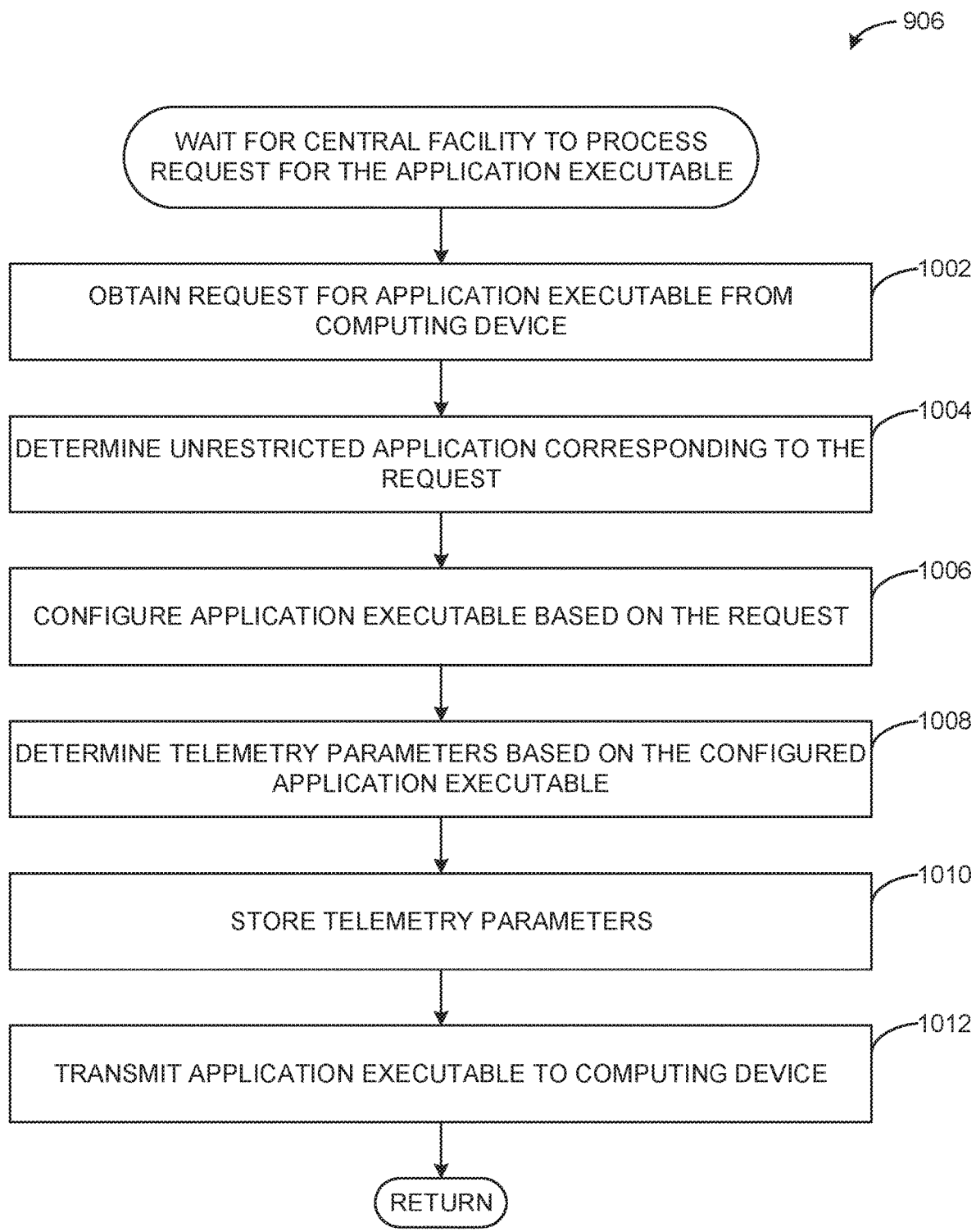
FIG. 10 is a flowchart representative of machine readable instructions that may be executed to implement the example central facility server of FIGS. 1-2 and 5 to process a request for an application executable of interest.

FIG. 10 is a flowchart representative of an example implementation of block 906 of FIG. 9 that may be performed by the example central facility 118 of FIGS. 1-2 and 5 to process a request for an application executable of interest. The example implementation of block 906 begins at block 1002, at which the example central facility 118 obtains a request for an application executable from a computing device. For example, the network interface 510 (FIG. 5) may obtain a request for one of the application executables 124 of FIG. 1 from the first computing device 102 of FIG. 1.

At block 1004, the example central facility 118 determines an unrestricted application corresponding to the request. For example, the application distributor 218 (FIGS. 2 and 5) may identify a first application executable of the application executables 124 included in the database 125 (FIGS. 1 and 5) based on the request. In such examples, the application distributor 218 can map (1) a software version included in the request that is associated with the restricted application 116 of FIG. 1 to (2) the first application executable that, when executed, can install an unrestricted application (e.g., the unrestricted application 126 of FIG. 1) that corresponds to an unrestricted version of the restricted application 116.

At block 1006, the example central facility 118 configures the application executable based on the request. For example, the application distributor 218 may configure the first application executable based on one or more parameters included in the request. In such examples, the application distributor 218 can enable and/or disable one or more functions of the unrestricted application based on an application parameter, a hardware parameter, a software parameter, etc., and/or a combination thereof included in the request. For example, the application distributor 218 may remove a library, a module, etc., corresponding to a disabled function and re-generate the first application executable to exclude the library, the module, etc. In other examples, the application distributor 218 may modify a configuration document to accompany the first application executable such as an Extensible Markup Language (XML) file.

At block 1008, the example central facility 118 determines telemetry parameters based on the configured application executable. For example, the telemetry aggregator 540 (FIG. 5) may generate a first telemetry parameter including data associated with an application parameter, a hardware parameter, a software parameter, etc., where the application parameter, the hardware parameter, the software parameter, etc., is based on telemetry data included in the request. In other examples, the telemetry aggregator 540 may update a telemetry parameter stored in the database 125 (FIGS. 1 and 5). For example, the telemetry aggregator 540 may decrease a value of a second telemetry parameter corresponding to a first quantity of computing devices that are operating in the restricted mode as indicated by the request. In other examples, the telemetry aggregator 540 may increase a value of a third telemetry parameter corresponding to a second quantity of computing devices that are operating in the unrestricted mode based on the switch of the first computing device 102 based on the switch of the first computing device 102 as indicated by the request.

At block 1010, the example central facility 118 stores telemetry parameters. For example, the telemetry aggregator 540 may store the first telemetry parameter in the database 125. In other examples, the telemetry aggregator 540 may replace values of the second and third telemetry parameters with respective updated values. At block 1012, the example central facility 118 transmits the application executable to the computing device. For example, the application distributor 218 may transmit the first application executable, the configured version of the first application executable, etc., to the first computing device 102. In such examples, the transmission to the first computing device 102 may invoke and/or otherwise trigger the RAU 114 to execute the first application executable, the configured version of the first application executable, etc. In response to transmitting the application executable to the computing device at block 1012, the example implementation of block 906 returns to block 908 of the example of FIG. 9 to obtain the application executable from the central facility.

Figure 11:
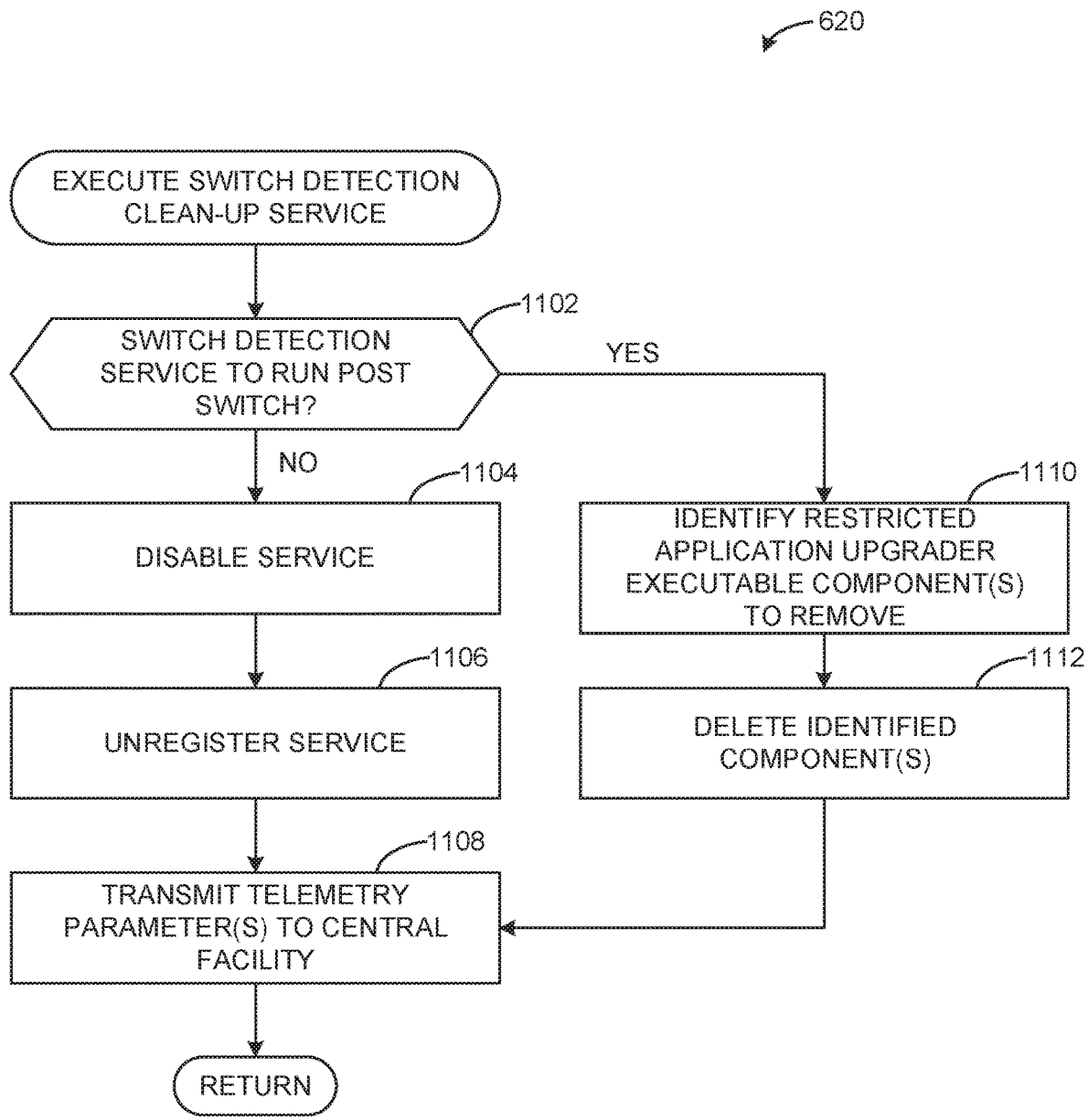
FIG. 11 is a flowchart representative of machine readable instructions that may be executed to implement the example switch detector of FIGS. 1-3 to execute a switch detection clean-up service.

FIG. 11 is a flowchart representative of an example implementation of block 620 of FIG. 6 that may be performed by the example switch detector 112 of FIGS. 1-3 to execute a switch detection clean-up service. The example implementation of block 620 begins at block 1102, at which the example switch detector 112 determines whether the switch detection service is to run post switch. For example, the register handler 330 (FIG. 3) may determine that the service used to detect switch events is no longer needed after the switch to the unrestricted OS 108.

If, at block 1102, the example switch detector 112 determines that the switch detection service is not to run post switch, then, at block 1104, the switch detector 112 disables the service. For example, the register handler 330 may disable the switch detection service. In response to disabling the service at block 1104, the example switch detector 112 unregisters the service at block 1106. For example, the register handler 330 may unregister the switch detection service with the unrestricted OS 108. In response to unregistering the service at block 1106, the example switch detector 112 transmits telemetry parameter(s) to the example central facility 118. For example, the switch detector telemetry agent 340 may transmit a telemetry parameter to the central facility 118, where the telemetry parameter is to indicate that the switch detection service of the first computing device 102 has been disabled and unregistered.

If, at block 1102, the example switch detector 112 determines that the switch detection service is to run post switch, then, at block 1110, the switch detector 112 identifies restricted application upgrader executable component(s) to remove. For example, the register handler 330 may identify one or more components, functions, etc., associated with the RAU 114 that are not needed post switch. In response to the identification at block 1110, the example switch detector 112 deletes the identified component(s) at block 1112. For example, the register handler 330 may delete the one or more components, functions, etc., associated with the RAU 114. In response to deleting the identified component(s) at block 1112, the example switch detector 112 transmits telemetry parameter(s) to the example central facility 118. For example, the switch detector telemetry agent 340 may transmit a telemetry parameter to the central facility 118, where the telemetry parameter is to indicate that one or more components of the RAU 114 have been deleted. In response to transmitting the telemetry parameter(s) to the example central facility 118 at block 1108, the example implementation of block 620 returns to block 622 of the example machine readable instructions 600 of FIG. 6 to store the OS mode.

Figure 12:
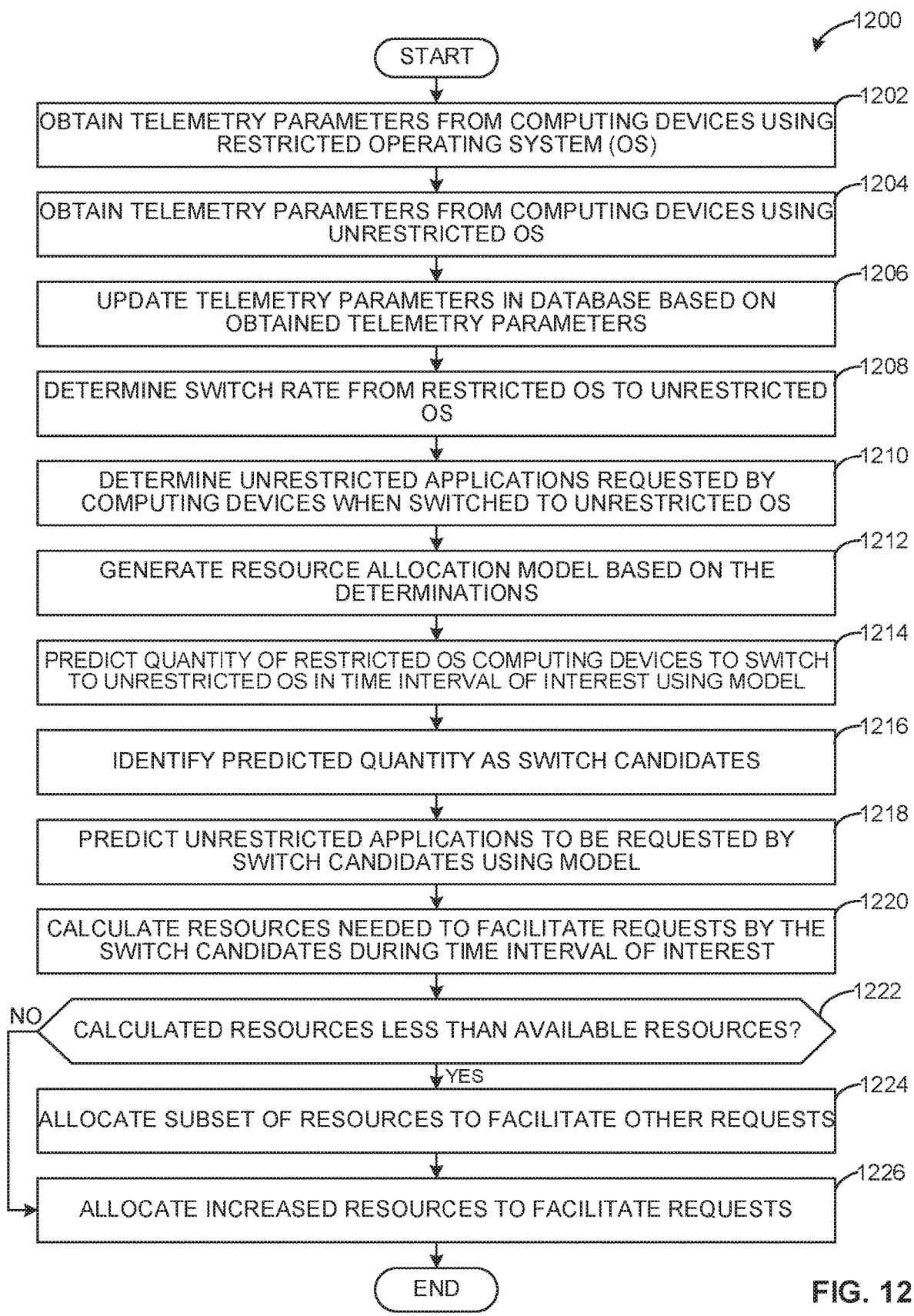
FIG. 12 is a flowchart representative of machine readable instructions that may be executed to implement the example central facility server of FIGS. 1-2 and 5 to manage resources of the central facility server based on an example resource allocation model.

FIG. 12 is a flowchart representative of example machine readable instructions 1200 that may be executed to implement the example central facility 118 of FIGS. 1-2 and 5 to manage resources of the central facility 118 based on an example resource allocation model. The example machine readable instructions 1200 of FIG. 12 begin at block 1202, at which the example central facility 118 obtains telemetry parameters from computing devices using a restricted OS. For example, the network interface 510 (FIG. 5) may obtain telemetry data including one or more telemetry parameters from a plurality of first computing device including the first computing device 102.

At block 1204, the example central facility 118 obtains telemetry parameters from computing devices using an unrestricted OS. For example, the network interface 510 may obtain telemetry data including one or more telemetry parameters from a plurality of second computing devices including the second computing device 104. At block 1206, the example central facility 118 updates telemetry parameters from the computing devices based on the obtained telemetry parameters. For example, the resource allocator 550 (FIG. 5) may store and update telemetry data stored in the database 125 with the obtained telemetry parameters from the first and second computing devices.

At block 1208, the example central facility 118 determines a switch rate from the restricted OS to the unrestricted OS. For example, the resource allocator 550 may determine a first quantity of computing devices at a first time that are operating in the restricted OS 106 and a second quantity of computing devices at the first time that are operating in the unrestricted OS 108 based on the telemetry parameters from the first and second computing devices. In such examples, the resource allocator 550 may determine the switch rate by comparing the first and second quantities to third and fourth quantities stored in the database 125. The third quantity may correspond to a quantity of computing devices operating in the example restricted OS 106 at a second time and the fourth quantity may correspond to a quantity of computing devices operating in the example unrestricted OS 108 at the second time. The example resource allocator 550 may determine the switch rate based on a comparison of the first through fourth quantities.

At block 1210, the example central facility 118 determines unrestricted applications requested by computing devices when switched to the unrestricted OS. For example, the application distributor 218 (FIGS. 2 and 5) may identify one or more of the unrestricted applications 126 that are requested by the computing devices after a switch to the unrestricted OS 108 based on ones of the application executables 124 that are requested by the computing devices.

At block 1212, the example central facility 118 generates a resource allocation model based on the determinations. For example, the resource allocator 550 may generate a computer-based model that predicts a quantity of resources needed to facilitate transfers of ones of the installer executables 122, the application executables 124, etc., from the central facility 118 to the computing devices 102, 104 based on the switch rate.

At block 1214, the example central facility 118 predicts a quantity of restricted OS computing devices to switch to an unrestricted OS in a time interval of interest using the model. For example, the resource allocator 550 may determine a first quantity of the first computing devices including the first computing device 102 that may switch to the unrestricted OS 108 within seven days.

At block 1216, the example central facility 118 identifies the predicted quantity as switch candidates. For example, the resource allocator 550 may identify the first quantity as the switch candidates. At block 1218, the example central facility 118 predicts unrestricted applications to be requested by the switch candidates using the model. For example, the resource allocator 550 may determine ones of the application executables 124 that are likely to be requested by the switch candidates using the resource allocation model.

At block 1220, the example central facility 118 calculates resources needed to facilitate requests by the switch candidates during the time interval of interest. For example, the resource allocator 550 may determine a quantity of computing resources, network resources, storage resources, etc., that the central facility 118 needs to facilitate the requests.

At block 1222, the example central facility 118 determines whether the calculates resources are less than available resources. For example, the resource allocator 550 may determine that one or more of the computing resources, network resources, storage resources, etc., of the central facility 118 are less than respective ones of the calculated computing resources, network resources, storage resources, etc. In such examples, the resource allocator 550 can allocate increased resources to satisfy the needs of the calculated resources.

If, at block 1222, the example central facility 118 determines that the calculated resources are less than the available resources, then, at block 1224, the central facility 118 allocates a subset of resources to facilitate other requests. For example, the resource allocator 550 may allocate a portion of one or more of the computing resources, the network resources, the storage resources, etc., to facilitate other computing tasks by the central facility 118. Advantageously, by re-allocating unused resources of the example central facility 118 to execute additional computing tasks, the central facility 118 can improve the efficiency of resources controlled and/or otherwise utilized by the central facility 118. In response to allocating the subset of resources at block 1224, the example machine readable instructions 1200 of FIG. 12 conclude.

If, at block 1222, the example central facility 118 determines that the calculates resources are not less than the available resources, control proceeds to block 1226 to allocated increased resources to facilitate requests. For example, the resource allocator 550 may obtain additional computing resources, the network resources, the storage resources, etc., and/or a combination thereof from a cloud-based resource repository. In response to allocating the increased resources to facilitate the request, the example machine readable instructions 1200 of FIG. 12 conclude.

Figure 13:
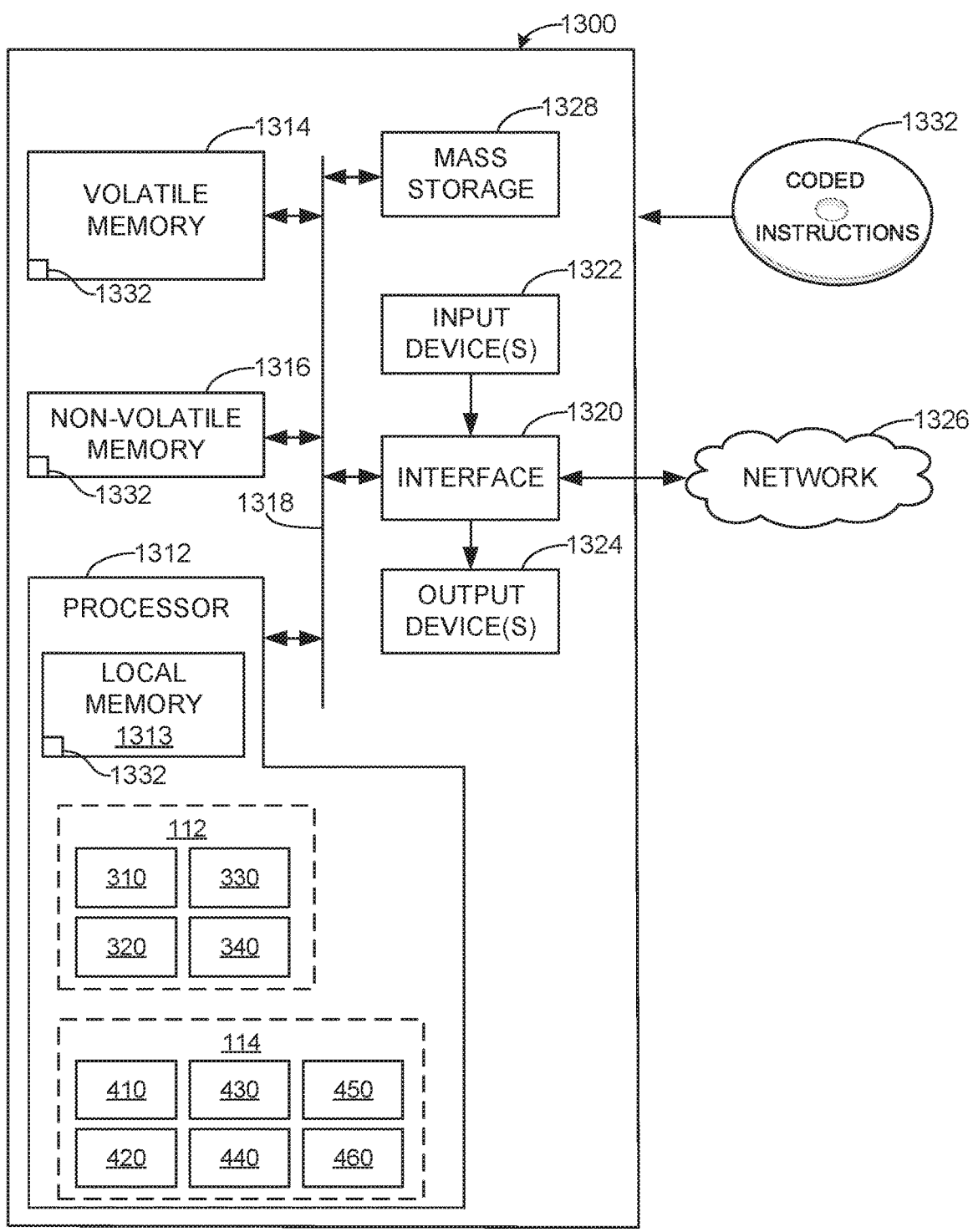
FIG. 13 is a block diagram of an example processing platform structured to execute the instructions of FIGS. 6-9 and/or 11 to implement the example switch detector of FIGS. 1-3 and the example restricted application upgrader of FIGS. 1-2 and 4.

FIG. 13 is a block diagram of an example processor platform 1300 structured to execute the instructions of FIGS. 6-9 and/or 11 to implement the computing devices 102, 104 of FIG. 1. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1312 implements the example switch detector 112 including the example OS mode determiner 310, the example switch event handler 320, the example register handler 330, and the example switch detector telemetry agent 340. In this example, the processor 1312 implements the example RAU 114 including the example profile determiner 410, the example application identifier 420, the example installer gatherer 430, the example application deployer 440, the example user-interface presenter 450, and the example RAU telemetry agent 460.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1320 of the illustrated example, thus, typically includes a graphics driver card, a graphics driver chip, and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIGS. 6-9 and/or 11 may be stored in the mass storage device 1328, in the volatile memory 1314, in the non-volatile memory 1316, and/or on a removable non-transitory computer readable storage medium such as a CD or DVD.

Figure 14:
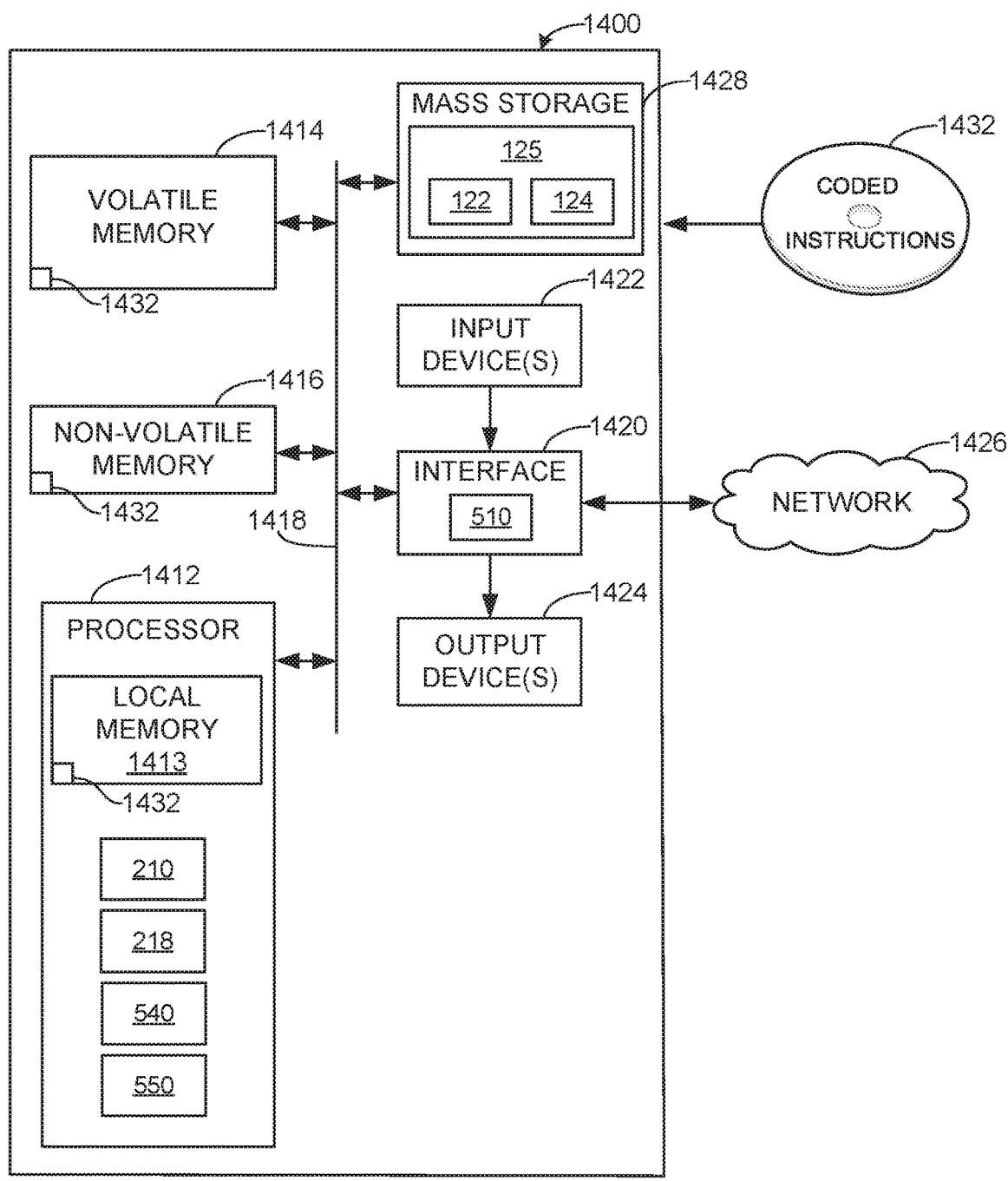
FIG. 14 is a block diagram of an example processing platform structured to execute the instructions of FIGS. 6, 10, and/or 12 to implement the example central facility server of FIGS. 1-2 and 5.

FIG. 14 is a block diagram of an example processor platform 1400 structured to execute the instructions of FIGS. 6, 10, and/or 12 to implement the example central facility 118 of FIGS. 1-2 and/or 5. The processor platform 1400 can be, for example, a server, a workstation, a self-learning machine (e.g., a neural network), or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1412 implements the example installer generator 210, the example application distributor 218, the example telemetry aggregator 540, and the example resource allocator 550.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1420 of the illustrated example, thus, typically includes a graphics driver card, a graphics driver chip, and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1420 implements the example network interface 510.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives. In this example, the mass storage devices 1428 implement the example database 125 including the example installer executable(s) 122 and the application executable(s) 124.

The machine executable instructions 1432 of FIGS. 6, 10 and/or 12 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus, and articles of manufacture have been disclosed that upgrade a restricted application to an unrestricted application after a computing device switches to an unrestricted version of an OS. Advantageously, by upgrading the restricted application, the disclosed methods, apparatus, and articles of manufacture increase available functions for use by a computing device. When the restricted application is an anti-virus application, an anti-malware application, etc., the disclosed methods, apparatus, and articles of manufacture enhance the operation of the computing device by preventing malware and/or virus attacks that could prevent the computing device from operating as intended. The increased available functions can be used to identify and overcome malware and/or virus attacks that cause conventional computing devices to cease operating as intended. The disclosed methods, apparatus and articles of manufacture are accordingly directed to one or more improvement(s) in the functioning of a computer.

The following pertain to further examples disclosed herein.

Example 1 includes a system to upgrade a restricted software application, the system comprising a switch detector to detect a switch of a computing device from a restricted operating system to an unrestricted operating system, and a restricted application upgrader to be invoked when the switch is detected, the restricted application upgrader is to generate a first request to a server to obtain a first executable, the first request including a parameter of a restricted software application of the computing device, execute the first executable to generate a second request to the server to obtain a second executable to install an unrestricted software application associated with the restricted software application, and execute the second executable to install the unrestricted software application.

Example 2 includes the system of example 1, wherein the switch detector is to detect the switch when a callback function provided by the switch detector to the unrestricted operating system is invoked.

Example 3 includes the system of example 2, wherein the computing device is in a second operating system mode at a second time and the switch detector is to detect the switch by determining a first operating system mode of the computing device at a first time, the first time before the second time, the first operating system mode stored in a database, comparing the first operating system mode to the second operating system mode, and detecting the switch when the second operating system mode does not match the first operating system mode.

Example 4 includes the system of example 1, wherein the switch detector is to transmit first telemetry data to the server prior to the switch, the first telemetry data to indicate that the computing device is using a restricted operating system, and transmit second telemetry data to the server after the switch, the second telemetry data to indicate that the computing device is using the unrestricted operating system.

Example 5 includes the system of example 1, wherein the restricted application upgrader is to generate the second request in response to obtaining an input from a user-interface.

Example 6 includes the system of example 1, wherein the parameter is a first parameter and the restricted application upgrader is to determine a profile of the computing device based on a second parameter of the restricted operating system and a third parameter of hardware associated with the computing device, determine a fourth parameter associated with the restricted software application, and generate the first request to include the first through fourth parameters.

Example 7 includes an apparatus to upgrade a restricted software application, the apparatus comprising an installer generator to generate a first executable in response to a first request from a computing device, the first request generated in response to the computing device detecting a switch from a restricted operating system to an unrestricted operating system, the first executable to cause the computing device to upgrade a restricted version of a software application based on a parameter of the restricted version, an application distributor to generate a second executable in response to a second request from the computing device, the second request in response to the computing device executing the first executable, and a network interface to transmit the second executable to cause the computing device to upgrade the restricted version with an unrestricted version.

Example 8 includes the apparatus of example 7, wherein the computing device is a first computing device and further including a telemetry aggregator to obtain first telemetry data from second computing devices including the first computing device, the first telemetry data to identify respective ones of the second computing devices that are using the restricted operating system, obtain second telemetry data from third computing devices including the first computing device, the second telemetry data to identify respective ones of the third computing devices that are using the unrestricted operating system, and a resource allocator to determine a rate at which the second computing devices are switching to the unrestricted operating system based on the first and second telemetry data.

Example 9 includes the apparatus of example 8, wherein the resource allocator is to predict a first quantity of the second computing devices to switch to the unrestricted operating system, determine a second quantity of hardware resources based on a difference between a third quantity of the hardware resources to facilitate requests by the first quantity and a fourth quantity of unused ones of the hardware resources, and allocate the hardware resources corresponding to the second quantity to facilitate the requests when the third quantity is more than the fourth quantity.

Example 10 includes the apparatus of example 8, wherein the resource allocator is to predict a first quantity of the second computing devices to switch to the unrestricted operating system, determine a second quantity of hardware resources based on a difference between a third quantity of the hardware resources to facilitate requests by the first quantity and a fourth quantity of unused ones of the hardware resources, and de-allocate the hardware resources corresponding to the second quantity when the fourth quantity is greater than the third quantity.

Example 11 includes the apparatus of example 7, wherein the parameter is a first parameter and the installer generator is to generate the first executable by determining a version of the restricted software application based on the first parameter, determining a quantity of storage resources of the computing device based on a second parameter included in the first request, determining a version of the unrestricted operating system based on a third parameter included in the first request, and generating instructions to cause the computing device to retrieve the unrestricted version based on the first through third parameters.

Example 12 includes the apparatus of example 7, wherein the application distributor is to generate the second executable by determining a manufacturer identifier of the computing device based on the second request, and generating instructions to cause the computing device to configure the unrestricted version based on the manufacturer identifier.

Example 13 includes the apparatus of example 7, wherein the computing device is a first computing device and the first executable and the second executable are stored in a database to be used by a second computing device.

Example 14 includes a non-transitory computer readable storage medium comprising instructions that, when executed, cause a server to generate a first executable in response to a first request from a computing device, the first request generated in response to the computing device detecting a switch from a restricted operating system to an unrestricted operating system, the first executable to cause the computing system to upgrade a restricted version of a software application based on a parameter of the restricted version, generate a second executable in response to a second request from the computing device, the second request in response to the computing device executing the first executable, and transmit the second executable to cause the computing device to upgrade the restricted version with an unrestricted version.

Example 15 includes the non-transitory computer readable storage medium of example 14, wherein the computing device is a first computing device and the instructions, when executed, cause the server to obtain first telemetry data from second computing devices including the first computing device, the first telemetry data to identify respective ones of the second computing devices that are using the restricted operating system, obtain second telemetry data from third computing devices including the first computing device, the second telemetry data to identify respective ones of the third computing devices that are using the unrestricted operating system, and determine a rate at which the second computing devices are switching to the unrestricted operating system based on the first and second telemetry data.

Example 16 includes the non-transitory computer readable storage medium of example 15, wherein the instructions, when executed, cause the server to predict a first quantity of the second computing devices to switch to the unrestricted operating system, determine a second quantity of hardware resources based on a difference between a third quantity of the hardware resources to facilitate requests by the first quantity and a fourth quantity of unused ones of the hardware resources, and allocate the hardware resources corresponding to the second quantity to facilitate the requests when the third quantity is more than the fourth quantity.

Example 17 includes the non-transitory computer readable storage medium of example 15, wherein the instructions, when executed, cause the server to predict a first quantity of the second computing devices to switch to the unrestricted operating system, determine a second quantity of hardware resources based on a difference between a third quantity of the hardware resources to facilitate requests by the first quantity and a fourth quantity of unused ones of the hardware resources, and de-allocate the hardware resources corresponding to the second quantity when the fourth quantity is greater than the third quantity.

Example 18 includes the non-transitory computer readable storage medium of example 14, wherein the parameter is a first parameter, the instructions are first instructions, and the first instructions, when executed, generate the first executable by determining a version of the restricted software application based on the first parameter, determining a quantity of storage resources of the computing device based on a second parameter included in the first request, determining a version of the unrestricted operating system based on a third parameter included in the first request, and generating second instructions to retrieve the unrestricted version based on the first through third parameters.

Example 19 includes the non-transitory computer readable storage medium of example 14, wherein the instructions are first instructions and the first instructions, when executed, generate the second executable by determining a manufacturer identifier of the computing device based on the second request, and generating second instructions to configure the unrestricted version based on the manufacturer identifier.

Example 20 includes the non-transitory computer readable storage medium of example 14, wherein the computing device is a first computing device and the instructions, when executed, cause the server to store the first executable and the second executable in a database to be used by a second computing device.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A system to upgrade a restricted software application, the system comprising:
   a switch detector to detect a switch of a computing device from a restricted operating system to an unrestricted operating system; and
   a restricted application upgrader to be invoked when the switch is detected, the restricted application upgrader to:
      generate a first request to a server to obtain a first executable, the first request including a parameter of a restricted software application of the computing device;
      execute the first executable to generate a second request to the server to obtain a second executable to install an unrestricted software application associated with the restricted software application; and
      execute the second executable to install the unrestricted software application.

2. The system of claim 1, wherein the switch detector is to detect the switch when a callback function provided by the switch detector to the unrestricted operating system is invoked.

3. The system of claim 2, wherein the computing device is in a second operating system mode at a second time and the switch detector is to detect the switch by:
   determining a first operating system mode of the computing device at a first time, the first time before the second time, the first operating system mode stored in a database;
   comparing the first operating system mode to the second operating system mode; and
   detecting the switch when the second operating system mode does not match the first operating system mode.

4. The system of claim 1, wherein the switch detector is to:
   transmit first telemetry data to the server prior to the switch, the first telemetry data to indicate that the computing device is using the restricted operating system; and
   transmit second telemetry data to the server after the switch, the second telemetry data to indicate that the computing device is using the unrestricted operating system.

5. The system of claim 1, wherein the restricted application upgrader is to generate the second request in response to obtaining an input from a user interface.

6. The system of claim 1, wherein the parameter is a first parameter and the restricted application upgrader is to:
   determine a profile of the computing device based on a second parameter of the restricted operating system and a third parameter of hardware associated with the computing device;
   determine a fourth parameter associated with the restricted software application; and
   generate the first request to include the first through fourth parameters.

7. An apparatus to upgrade a restricted software application, the apparatus comprising:
   an installer generator to generate a first executable in response to a first request from a computing device, the first request generated in response to the computing device detecting a switch from a restricted operating system to an unrestricted operating system, the first executable to cause the computing device to upgrade a restricted version of a software application based on a parameter of the restricted version;
   an application distributor to generate a second executable in response to a second request from the computing device, the second request in response to the computing device executing the first executable; and a network interface to transmit the second executable to cause the computing device to upgrade the restricted version with an unrestricted version.

8. The apparatus of claim 7, wherein the computing device is a first computing device and further including:
a telemetry aggregator to:
obtain first telemetry data from second computing devices including the first computing device, the first telemetry data to identify respective ones of the second computing devices that are using the restricted operating system;
obtain second telemetry data from third computing devices including the first computing device, the second telemetry data to identify respective ones of the third computing devices that are using the unrestricted operating system; and
a resource allocator to determine a rate at which the second computing devices are switching to the unrestricted operating system based on the first and second telemetry data.

9. The apparatus of claim 8, wherein the resource allocator is to:
predict a first quantity of the second computing devices to switch to the unrestricted operating system;
determine a second quantity of hardware resources based on a difference between a third quantity of the hardware resources to facilitate requests by the first quantity and a fourth quantity of unused ones of the hardware resources; and
allocate the hardware resources corresponding to the second quantity to facilitate the requests when the third quantity is more than the fourth quantity.

10. The apparatus of claim 8, wherein the resource allocator is to:
predict a first quantity of the second computing devices to switch to the unrestricted operating system;
determine a second quantity of hardware resources based on a difference between a third quantity of the hardware resources to facilitate requests by the first quantity and a fourth quantity of unused ones of the hardware resources; and
de-allocate the hardware resources corresponding to the second quantity when the fourth quantity is greater than the third quantity.

11. The apparatus of claim 7, wherein the parameter is a first parameter and the installer generator is to generate the first executable by:
determining a first version of the restricted software application based on the first parameter;
determining a quantity of storage resources of the computing device based on a second parameter included in the first request;
determining a second version of the unrestricted operating system based on a third parameter included in the first request; and
generating instructions to cause the computing device to retrieve the unrestricted version based on the first through third parameters.

12. The apparatus of claim 7, wherein the application distributor is to generate the second executable by:
determining a manufacturer identifier of the computing device based on the second request; and
generating instructions to cause the computing device to configure the unrestricted version based on the manufacturer identifier.

13. The apparatus of claim 7, wherein the computing device is a first computing device and the first executable and the second executable are stored in a database to be used by a second computing device.

14. A non-transitory computer readable storage medium comprising instructions that, when executed, cause a server to:
generate a first executable in response to a first request from a computing device, the first request generated in response to the computing device detecting a switch from a restricted operating system to an unrestricted operating system, the first executable to cause the computing device to upgrade a restricted version of a software application based on a parameter of the restricted version;
generate a second executable in response to a second request from the computing device, the second request in response to the computing device executing the first executable; and
transmit the second executable to cause the computing device to upgrade the restricted version with an unrestricted version.

15. The non-transitory computer readable storage medium of claim 14, wherein the computing device is a first computing device and the instructions, when executed, cause the server to:
obtain first telemetry data from second computing devices including the first computing device, the first telemetry data to identify respective ones of the second computing devices that are using the restricted operating system;
obtain second telemetry data from third computing devices including the first computing device, the second telemetry data to identify respective ones of the third computing devices that are using the unrestricted operating system; and
determine a rate at which the second computing devices are switching to the unrestricted operating system based on the first and second telemetry data.

16. The non-transitory computer readable storage medium of claim 15, wherein the instructions, when executed, cause the server to:
predict a first quantity of the second computing devices to switch to the unrestricted operating system;
determine a second quantity of hardware resources based on a difference between a third quantity of the hardware resources to facilitate requests by the first quantity and a fourth quantity of unused ones of the hardware resources; and
allocate the hardware resources corresponding to the second quantity to facilitate the requests when the third quantity is more than the fourth quantity.

17. The non-transitory computer readable storage medium of claim 15, wherein the instructions, when executed, cause the server to:
predict a first quantity of the second computing devices to switch to the unrestricted operating system;
determine a second quantity of hardware resources based on a difference between a third quantity of the hardware resources to facilitate requests by the first quantity and a fourth quantity of unused ones of the hardware resources; and
de-allocate the hardware resources corresponding to the second quantity when the fourth quantity is greater than the third quantity.

18. The non-transitory computer readable storage medium of claim 14, wherein the parameter is a first parameter, the instructions are first instructions, and the first instructions, when executed, generate the first executable by:
- determining a first version of the restricted version of the software application based on the first parameter;
- determining a quantity of storage resources of the computing device based on a second parameter included in the first request;
- determining a second version of the unrestricted operating system based on a third parameter included in the first request; and
- generating second instructions to retrieve the unrestricted version of the software application based on the first through third parameters.

19. The non-transitory computer readable storage medium of claim 14, wherein the instructions are first instructions and the first instructions, when executed, generate the second executable by:
- determining a manufacturer identifier of the computing device based on the second request; and
- generating second instructions to configure the unrestricted version based on the manufacturer identifier.

20. The non-transitory computer readable storage medium of claim 14, wherein the computing device is a first computing device and the instructions, when executed, cause the server to store the first executable and the second executable in a database to be used by a second computing device.

* * * * *